United States Patent [19]

Embury

[11] 4,082,211

[45] Apr. 4, 1978

[54] METHOD FOR FABRICATING TAPERED TUBING

[76] Inventor: Lloyd Elliott Embury, 85 Edenbridge Dr.,, Islington Center, Maple, Ontario, Canada

[21] Appl. No.: 691,971

[22] Filed: Jun. 2, 1976

Related U.S. Application Data

[60] Division of Ser. No. 583,449, Jun. 19, 1975, which is a continuation of Ser. No. 408,254, Oct. 23, 1973, abandoned, which is a continuation of Ser. No. 213,327, Dec. 29, 1971, abandoned, which is a continuation-in-part of Ser. No. 122,136, Mar. 8, 1971, abandoned, which is a continuation of Ser. No. 738,381, Jun. 17, 1968, abandoned.

[30] Foreign Application Priority Data

Jun. 16, 1967 Canada .................................. 27966

[51] Int. Cl.$^2$ ........................................... B23K 31/06
[52] U.S. Cl. ....................................... 228/145; 72/49; 219/62
[58] Field of Search .................. 228/17, 17.7, 145; 219/62; 72/49, 136, 167

[56] References Cited

U.S. PATENT DOCUMENTS

| 2,100,307 | 11/1937 | McMinn | 228/145 X |
| 3,191,289 | 6/1965 | Fleischer | 228/145 X |
| 3,262,624 | 7/1966 | Benteler et al. | 228/17 |
| 3,567,101 | 3/1971 | Ranne | 228/17.7 X |
| 3,601,570 | 8/1971 | Davis | 228/17.7 X |

FOREIGN PATENT DOCUMENTS 108,257  8/1939  Australia ................................ 28/145

Primary Examiner—Donald G. Kelly
Assistant Examiner—K. J. Ramse
Attorney, Agent, or Firm—Cecil C. Kent

[57] ABSTRACT

Tapered spiral tube in continuous lengths is fabricated with an alternating increasing and decreasing diameter, the length being severed at the focus of change. The taper may be straight, convex or concave, the tube being produced from strip-stock which is squeezed between biasing rollers whereby one or the other edge is thinned, and as a consequence lengthened and convexly curved. The entire fabricating process is automatic, being predetermined by templet means and monitored by feed-back measures felt by the tube while being fabricated.

15 Claims, 32 Drawing Figures

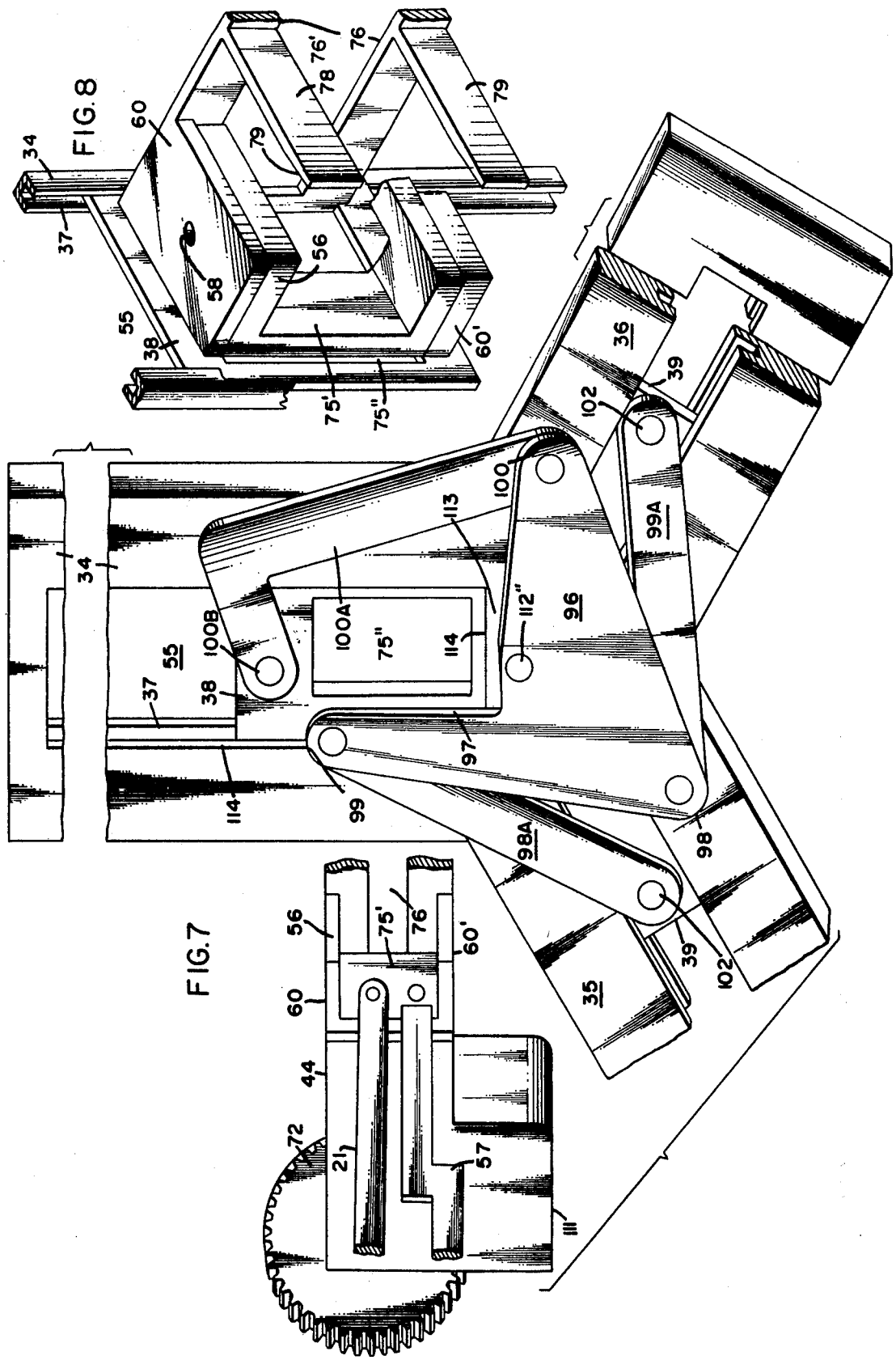

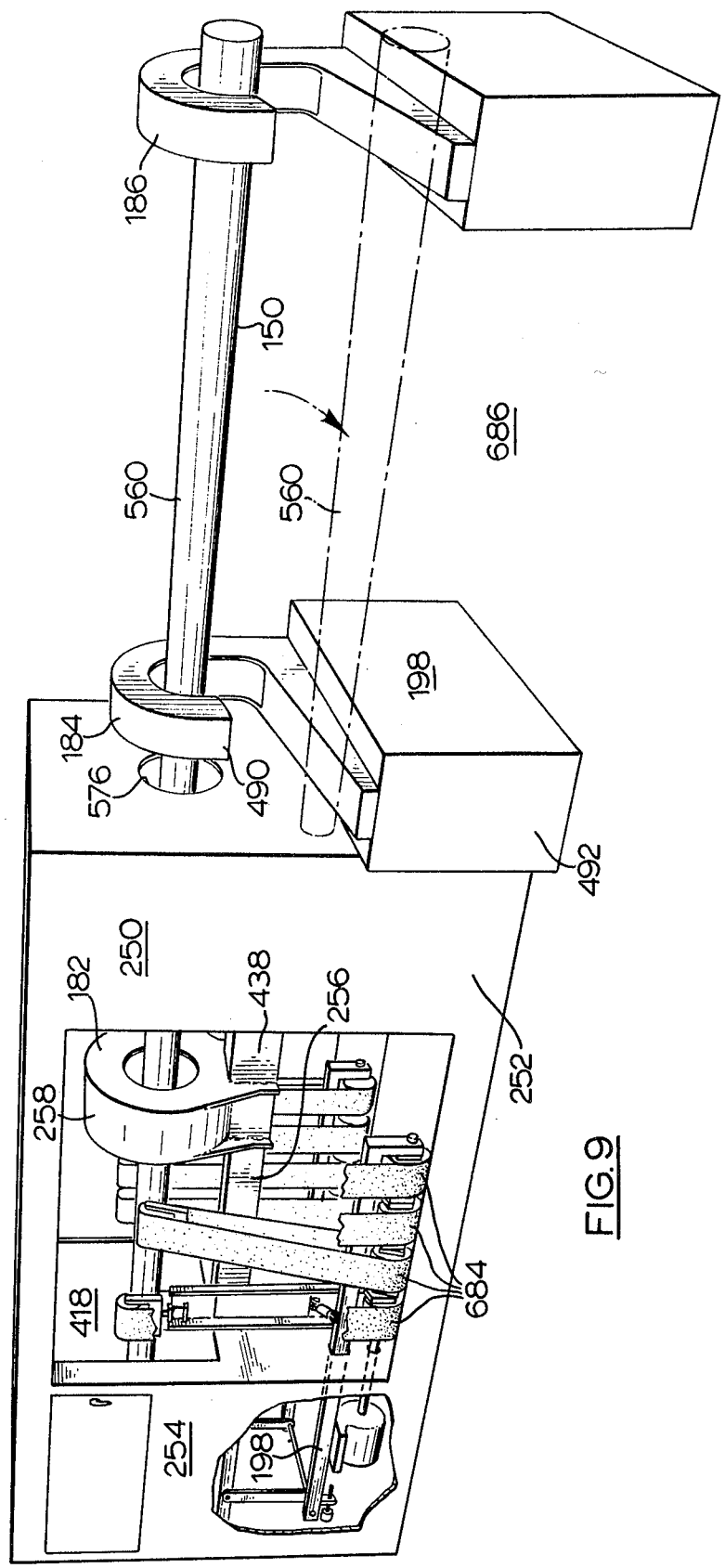

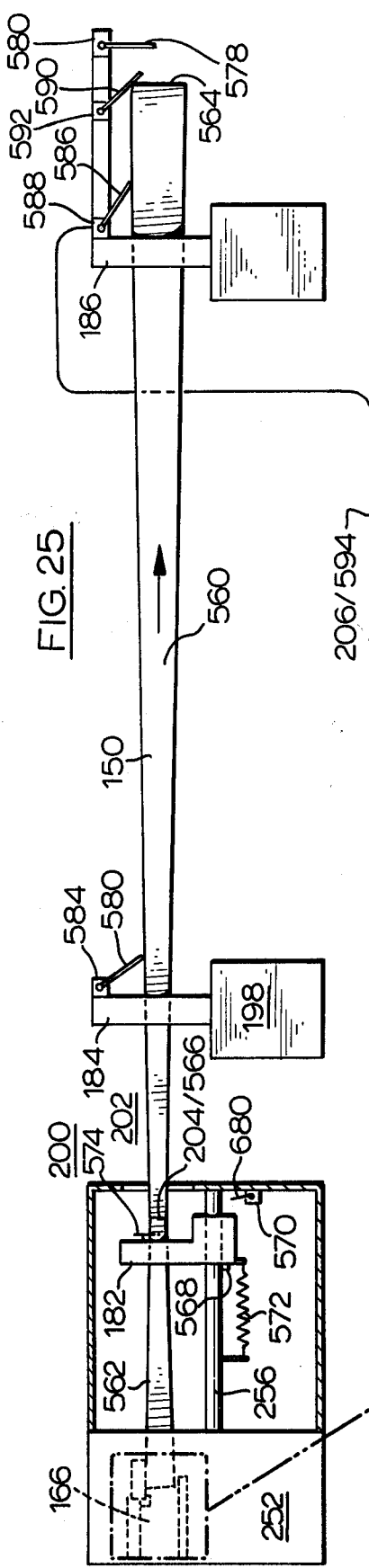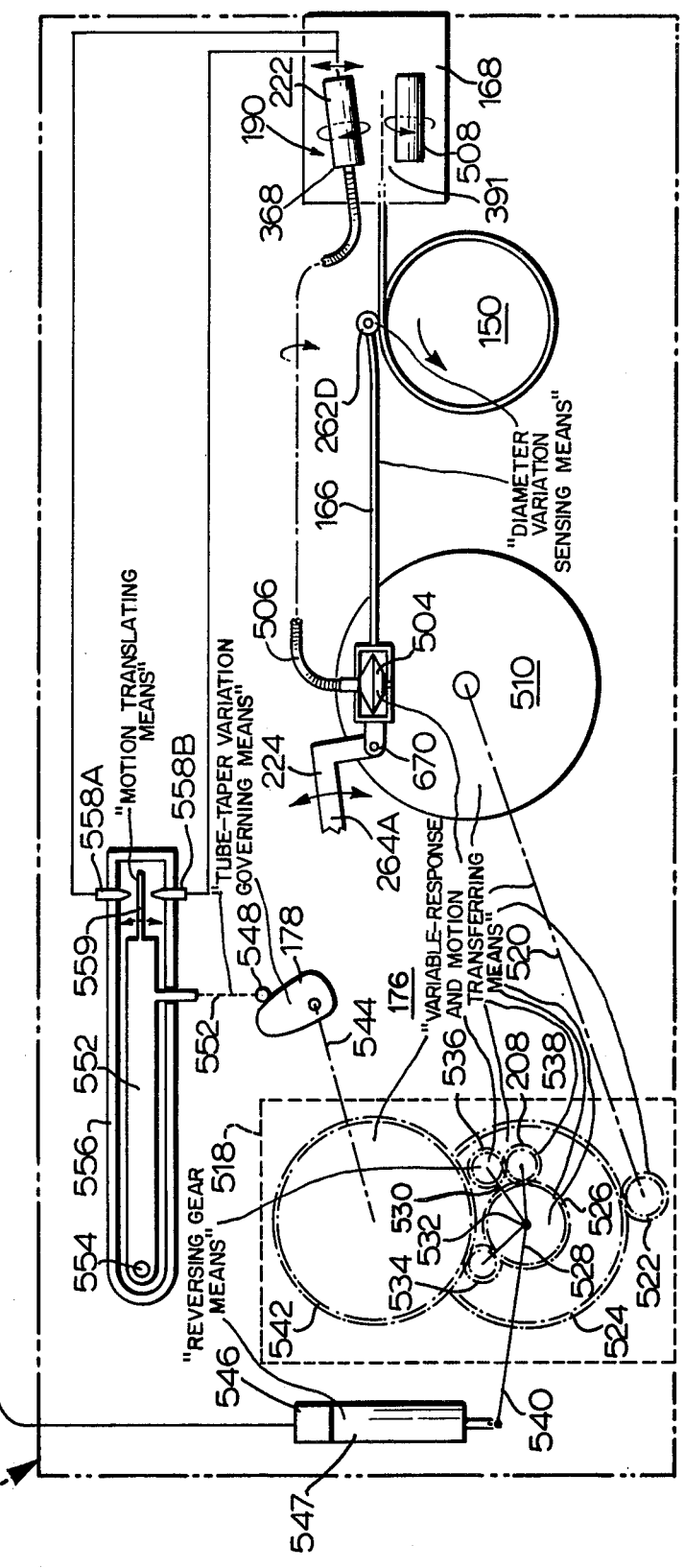
FIG. 25

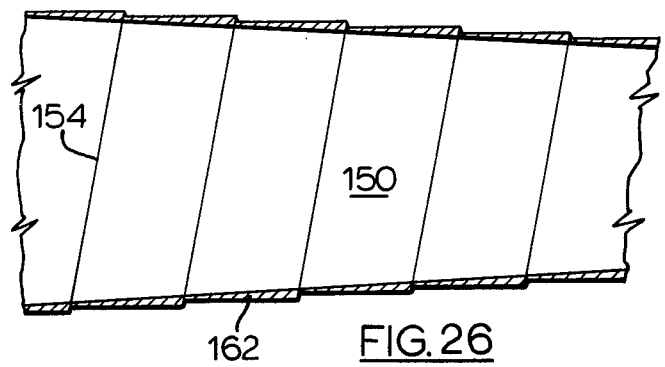
FIG. 26
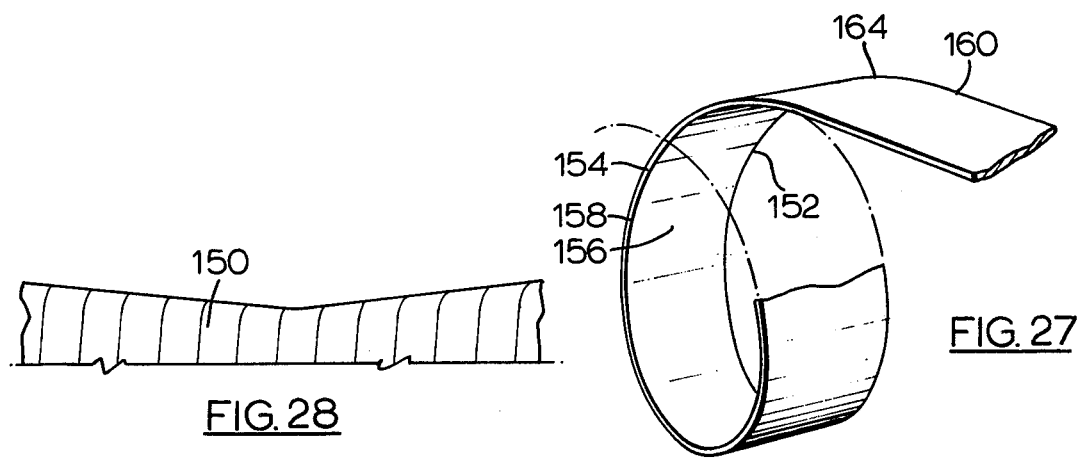
FIG. 28
FIG. 27
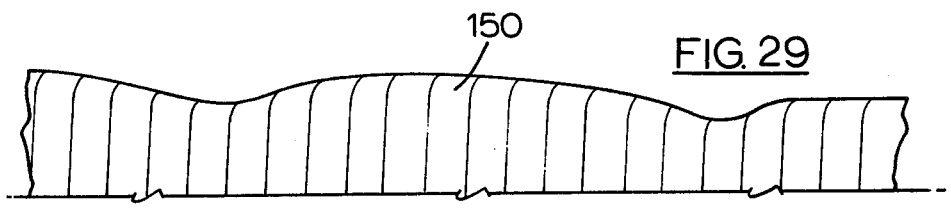
FIG. 29
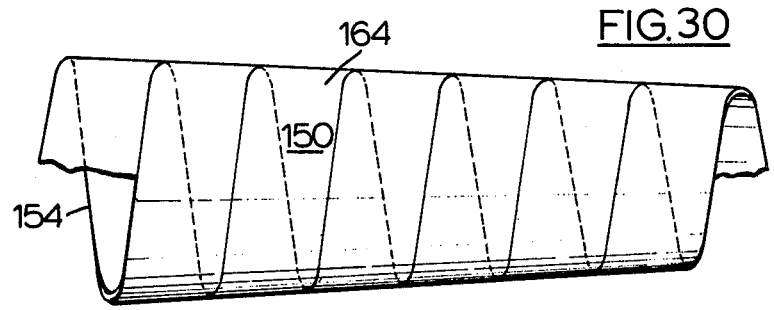
FIG. 30

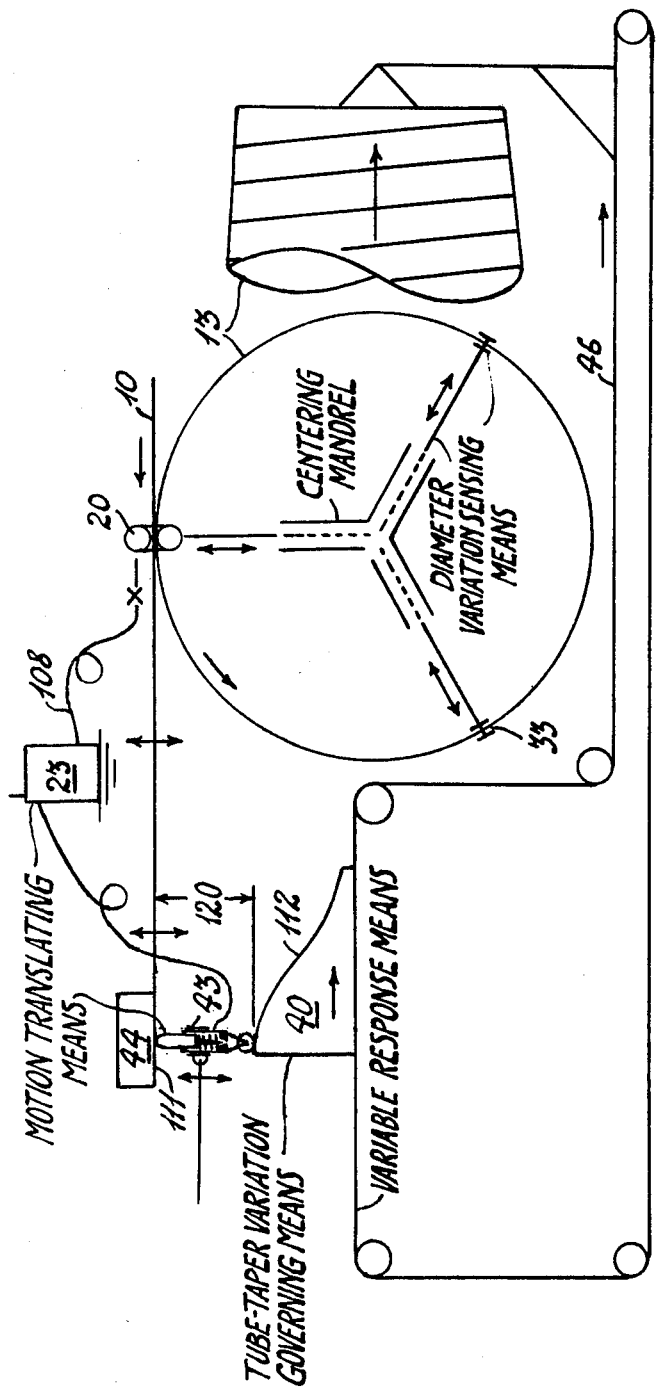

METHOD FOR FABRICATING TAPERED TUBING

This is a division of application Ser. No. 583,449, filed June 19, 1975, which is a continuation of application Ser. No. 408,254, filed Oct. 21, 1973, now abandoned, which was a continuation of application Ser. No. 213,327, filed Dec. 29, 1971, now abandoned, which was a continuation in part of application Ser. No. 122,136, filed Mar. 8, 1971, now abandoned, which a continatuion of application Ser. No. 738,381, filed June 17, 1968, now abandoned.

The present invention relates to methods for fabricating tubing.

The said invention includes a means and method for fabricating tube out of flat strip-stock (also herein indifferently called ribbon-stock) which, as far as can presently be foreseen will be metal stock although such is not necessarily the case, by winding the stock into a chain of continuously connected complete 360° frusto-conical. spiral rings or turns, the adjcant edges of adjacent rings or turns being so welded as to provide a smooth external tube-surface wherein the adjacent ring-surfaces are co-linear, the machine including means for edge-joining each ring to the next during the transition from strip-stock to tube. The invention as illustrated and described with reference to the first embodiment thereof is primarily for producing tube as aforesaid which tapers outwardly or increases in diameter at the fabricating or head end of the machine either concavely or convexly and either for the whole or some portion of its length. An example of the use of a tube or pole which is concavely tapered might be for ornamental purposes as at exhibitions and the like for various unspecified purposes. The second embodiment of the invention fabricates a pole which may either taper outwardly or inwardly for either the whole or a portion of a given length thereof, such fabrication being, in the second embodiment, continuous with means provided for severing pole being fabricated into predetermined lengths such that (for instance) each alternative length will be one which tapers outwardly or grows diametrically as from the locus of fabrication, while the intervening alternate lengths will diminish starting from the maximum diameter of the previous length.

The known prior art consists of U.S. Pat. Nos. 2,351,152, 2,991,740 and 3,309,003 of June 13, 1944, July 11, 1961 and Mar. 14, 1967 to H. H. Scnick, W. Eckhardt and T. J. Crawford respectively. Eckhardt and Crawford show means for fabricating cylindrical butt-edged and welded tubing formed of strip-stock. Schick shows a nose-cone of spiral strip-stock, but each succeeding ring thereof overlaps its predecessor as best shown in FIG. 2 of his patent. The advantage of tapered vertical structures over uniformly cylindrical ones for many purposes is universally appreciated. Resort to lapping relationship to achieve taper in a slender vertical column produces undesirable top-heaviness. Pole formed according to the present invention avoids the undesirable characteristics of both cylindrical vertical poles and tapered overlapping spiral poles. It also has the additional advantage of the ease with which a convex taper can be imparted to add still further stiffness and grace. A further object of the invention is to provide apparatus by means of which tubing, and perhaps certain other, and particularly deep, generally frusto-conical articles of manufacture may be fabricated, or essentially so, at a price which makes such tubing and other articles of manufacture economically acceptable.

The first embodiment of the invention also embodies a machine which includes means on the head assembly thereof for maintaining axial alignment between the centre of the tube at the leading end thereof (which is made fast to a tailstock assembly having a rotating spindle) and the centre of said tube as it is in process of being formed into such at the trailing or head end assembly of said machine, regardless of the gradually variable diameter of the tube while in process of being manufactured out of said strip-stock.

The first embodiment of the invention also consists of a machine including a non-rotatable head end guide assembly into which flat strip-stock enters tangentially to the tube axis to be guided into continuous spiral ring form with the edges of each ring joined to form tube of gradually increasing diameter, with the said head end guide assembly remaining stationary, while the strip-stock being transformed into tube, and the manufactured tube, rotates about a tailstock assembly, which tailstock assembly is at the same time moved away from said head end assembly by the tube-fabricating operation itself.

The first embodiment of the invention also comprises the subject matter of the last preceding paragraph together with means employable when the tube is of gradually increasing diameter, for deforming most usually by thinning or milling i.e., compressing and hence stretching the trailing edge-area of the entering strip-stock so that it assumes a very slight curvature, the pressure upon, or compression of said edge-area according to the rate of diametrical increase per unit of length being predetermined by a moving templet profile, the templet movement being in turn governed by the end-thrust of said tube as it is formed, against said tail-stock, the tail stock movement operating a sprocket and chain assembly combined with a threaded-shaft drive to the templet. The templete controls a source of power on the aforesaid head end assembly of the machine to vary the pressure of one roller against another of a strip feeding, strip stretching, and tube rotating roller-pair, between each member which said entering strip-stock passes.

It is recognized that in view of this disclosure strip-stock might be fabricated into the edge-curved condition contemplated with or without an edge-area thickness differential on the output side and/or fabricated into the transversely variously edge area thickened cross-sectional configurations contemplated and fed into the machine in the form in which it is to be transformed into tube, thus perhaps simplifying the strip-stock admitting structure. Accordingly another novel feature of the invention resides in the material employed for the novel fabrication of tapered tube when such material is in the form of "ribbon" flat stock having opposite elongated edges which are at least predominantly correspondingly curved in the common plane which spans said edges when the stock between the edges is lying flat.

It is a further object of both embodiments of the invention to provide rotary and longitudinal movement to the tube being formed by the end-thrust of the incoming strip-stock, thus saving substantial drive power consumption and, in addition, via one or other of said forms of movement, to provide tube diameter information feedback.

The invention also comprises means integral with the afore-said head end guide assembly for controlling the diameter of the spiral ring initially formed following entry of the strip-stock to said head end assembly.

The invention furthermore comprises in a second preferred embodiment the process and apparatus for use in the formation of gradually varying diameter tube the spiral winding of strip-stock into endless tube wherein the entering strip-stock is initially essentially both parallel-edged and straight-edged so as to impart edge curvature thereto in the plane of the stock according to the gradient, degree of slope or rate of diametrical change per linear foot of tube at any particular section of its length, and particularly such process when it consists of thinning down or, as by milling, compressing and stretching one edge-area of the stock either before or essentially simultaneously with the spiral winding thereof.

Essentially the second embodiment of the invention consists of means and a method for fabricating an endless tube of predetermined increasing or decreasing diameter in a continuous operation, including means for suitably supporting such a tube, cutting it into lenghts as desired and releasing cut lengths for discharge at a reception area.

A still further object is to provide tube and perhaps other deep or deeply cavitated articles characterized by being formed of spiral butt bonded (at present preferably welded) contiguous rings which are externally coplanar and internally slightly stepped in view of such rings being formed of strip-stock one edge area of which is thinner than the other. The term "helix" and its inflections and "spiral" are interchangeably used herein and by "spiral rings" is generally meant one 360° circle of flat ribbon stock in a coterminous unitary succession of same. It is a further object of the present invention to provide the aforesaid features in a machine of relative simplicity, low maintenance costs and one which requires relatively little supervision or skill in operation.

With the foregoing objects in view, and such other or further purposes, advantages or novel features as may become apparent from consideration of this disclosure and specification, the present invention consists of the inventive concept which is comprised, embodied, embraced, or included in any means, method, process, product, construction, composition, arrangement of parts or new use of any of the foregoing which may be herein exemplified in one or more specific embodiments of such concept, reference being had to the accompanying drawings in which:

FIG. 7 is a clamshell-view in flat parallel perspective of the three-point centering action, pinch-rolls bracket and gear-housing.

FIG. 8 is a fragmentary perspective view simplifying and thereby augmenting FIG. 6.

FIG. 9 is a perspective representation of an improved modification of the present invention and to which modification FIGS. 10–25, 28 & 29, and 31 exclusively relate.

FIG. 25 is a topological representation of the machine of FIG. 9 in combination with tube diameter control means, feed rollers, tube diameter reversing gear and tube-length cutting arrangements.

FIG. 26 is a fragmentary longitudinal cross-sectional representation considerably out of scale for clarity, of the form of product or tubing produced by the present machine.

FIG. 27 is a perspective representation of a single spiral ring of an edge-squeezed form which may be employed in association with this machine.

FIG. 28 is an elongated half-round representation of the alternate contracting and expanding form of tube which may be produced by the present machine.

FIG. 29 is a longitudinal half-round representation of a fancy form of tube which may be produced by the present machine but very materially exaggerated in respect of certain curvatures for illustrative purposes only.

FIG. 30 is a fragmentary representation similar to FIG. 26 but depicting a section of tube in complete circularity.

FIG. 32 is a topological representation of the first embodiment of the invention in general similar to FIG. 25.

In the drawings, like characters of reference designate similar parts in the several Figures.

Figure 1:
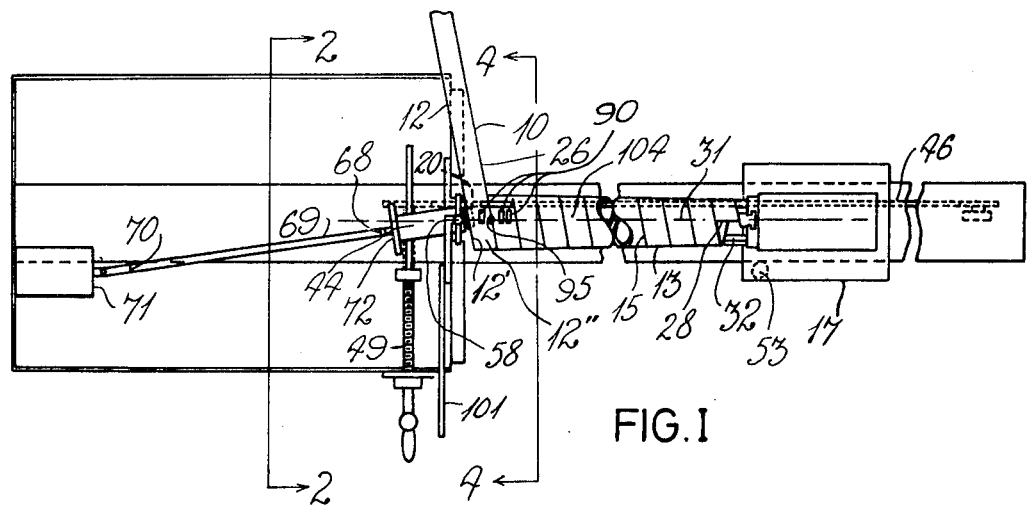
FIG. 1 is a schematized plan view of the present invention mainly for orientation with the following views.

PRELIMINARY STATEMENT OF FIRST EMBODIMENT:

The first embodiment of the invention illustrated in FIGS. 1–8 is designed to fabricate tube of a varying diameter throughout its length, such as suitable for a pole, from straight strip-stock, from a leading or starting end of minimum predetermined diameter, to a maximum diameter and pole length, at a predetermined rate of diametrical increaase or growth. The diametrically growing end is also herein considered to be the trailing end of the pole, while in course of fabrication.

The pole is thus tapered or conical, and for all practical purposes is frusto-conical. However, the diametrical and longitudinal conical growth of the pole, while being fabricated, may be such that the rate of diametrical increase is constant as in the accompanying FIG. 1, to provide a straight taper or a purely frusto-conical pole, or it may be convexly (as in FIG. 5), or concavely tapered (i.e. "bellied" or "waisted") and such forms can change within the scope of the example of the invention herein disclosed, so long as the lengthening of the pole in either cylindrical (as shown in the accompanying FIG. 3) or is in some way diametrically increasing. However, again by modification within the scope of the present inventive conceptual description, diminution of diameter with increasing pole length could be achieved.

The increasing girth of the pole at the fabricating head or trailing end is achieved by stretching, hence lengthening and so reducing the trailing edge of a previously straight and parallel-edge length of strip-stock from a nearby roll, as it enters the machine at an angle between a pair of pinch rollers. If such pressure were to remain constant, such reduction of thickness of the edge and consequent elongation of the material causes continuous, uniform semi-circular curvature of said strip in its plane about a radius, so that it is an arc (or circle) of x radius.

The pressure and consequent elongation required at any given point during the fabrication of tapering pole is determined in this machine by comparing information derived from a template (which indicates what pole diameter is intended at that point) with the actual diameter of the pole while being fabricated, and the resulting information used to effect greater or lesser pressure on the pinch rollers and consequent change of rate of increase in the diameter of the pole required at that instant to achieve a smooth taper.

If all pressure is released upon the trailing edge, the results will be a purely cylindrical tube.

It should be understood that the flat strip is welded, opposite to the edge of stretching, on initially coming into contact with the previously fabricated tube welded on the last turn, in a perfectly abutting alignment.

INITIAL SUMMARY DESCRIPTION OF FIRST EMBODIMENT:

The present invention, in terms of process, relates to the formation of gradually variable diameter tube by the novel combination of steps which comprise (i) the spiral winding of strip-stock into a continuous series of spiral rings each succeeding one of which contributes to form said tube as soon as it is individually fully formed, (ii) with the adjacent edges of adjacent rings in joined abutting relationship, and (iii) treating strip-stock 10 which initially is essentially both parallel-edged and straight-edged, so as to impart edge-curvature to it in its own plane.

Particularly the aforesaid process consists of varying the thickness of one edge of the stock relative to the thickness of the opposite edge thereof immediately prior to, and hence substantially simultaneous with the formation of said stock into tube formed of abutting-edge welded spiral rings 11, and most particularly the process of reducing the thickness or gauge of the strip-stock 10 in the area of the trailing edge 12 thereof prior to or substantially simultaneously, as aforesaid, with the spiral winding of the stock into ring form, by milling the same, but varying the amount of strip-edge stretching pressure applied, according to the slope of the frusto-conical tube-section being formed, or the rate of increase in the diameter of each newly formed ring 11. The process also includes the step of welding each ring continuously along adjacent edges 14, as at 15.

The machine for effectuating the aforesaid process comprises essentially a non-rotatable head-end guide assembly generally designated 16, a longitudinally moveable tailstock assembly generally designated 17, means in the form of a conventional sigma welding head 18 for edge joining each ring to the next ring adjacent as it is formed, and an elongated mounting structure generally designated 19 upon which said head-end guide assembly and tailstock assembly are positioned.

The means for treating the strip-stock so as to impart edge curvature thereto, and particularly for applying pressure and consequent stretching and reduction of thickness to the trailing edge 12 as well as being the means for forcibly feeding stock tangentially into the machine consists primarily of a roller means essentially embodying a pair of pinch rollers 20. The direct means for varying pressure between said rollers according to the ring-diameter required at any given point upon the pole upon the pole length may be said to comprise essentially the lever 21 pivotted at 22, and the source of power generally designated 23 typically in the form of a compressed air cylinder 24 and upwardly forced piston rod 25. These parts are designated as the primary motion translating means of this embodiment.

The means for urging the leading edge 26 of strip-stock 10 into snug edge-abutting relationship against the trailing edge 12 of the ring immediately next ahead as the stock enters the assembly 16 and means for permitting rotation of the tube and stock assembly, may in part be said to comprise the tube rotating thrust which the roller-pair 20 exerts upon the stock as it enters. This thrust also rotates the tube so that it grows longitudinally with the acquisition of additional spiral rings, and causes tailstock assembly 17 to travel to the right with respect to such as the accompanying FIGS. 1 or 5. Suitable braking means (not shown) are also provided to retard the aforesaid tail-stock travel and thereby aid in the formation of tightly abutting flush joints between the spiral rings forming tube 13.

However, it is important to note that at the same moment as the trailing edge 12 of strip-stock 10 enters between the roller pair 20, (except for the first "round" thereof threaded through at the startup of a pole fabricating operation as may be referred to hereinafter). The leading edge exactly opposite to that being squeezed is being welded by the sigma welder 18 to the trailing edge of the tube, or the trailing edge of the next spiral ring ahead. As a consequence, except for the leader or round lead in for startup as aforesaid, every inch of entering stock is leading edge-welded, and simultaneously trailing-edge stretched. Therefore the tube 13 is being end shifted to the right with respect to such as the accompanying FIG. 5 under the influence of the entering strip-stock while the as yet unwelded but squeezed trailing-edge 12' is therefore assisted into the required conforming curvature by the fact that the corresponding portion of the leading edge of the same piece of stock is simultaneously being welded.

The means for centering the axis of tube 13 as it is being formed relative to the leading end 28 thereof on the tailstock assembly generally comprises the pair of guide roller assemblies designated 29 and 30, together with the aforesaid roller pair 20, these three actions being arranged for equal radial movement toward and away from the tube axis 31 which tube axis is permanently that of the similarly numbered axis of rotation of the spindle 32 of tailstock assembly 17 upon which the leading end 28 of tube 13 is mounted. It is accordingly to be understood that the guide roller assemblies 29, 30 and the roller pair 20 are connected for equi-distant radial movement toward and away from axis 31, and the guide rollers 33 and 33' each comprise essentially a pair of spaced discs within the leading segment of which the trailing edge of the ring 11 being formed is held.

The aforesaid two lower guide rollers 33 are accordingly circumferentially arranged, and, including the roller pair 20 are set 120° apart. The means for automatically centering the axis of said tube as it is being formed relative to the leading end of the tube on the tailstock assembly (or means for maintaining axial alignment between the center of tube 13 at its leading end 28 and its center while being formed) also include a radius equalizing assembly comprised of three pairs of spaced and parallel stilus 34, 35 and 36 having ways 37 therein for the sliding reception of bearing blocks 38 and 39 forming part of said guide roller assemblies 29 and 30.

The pressure between the pinch roller pair 20 and consequent ring-diameter variation is controlled at least partly by the movement of tailstock assembly 17 away from head-end guide assembly 16 by means which embody the templet 40 (as principal component of what is defined as the "primary tube-taper (variation-governing means" of this embodiment) connected to mounting structure 19, the follower-action collectively designated 41 being in operative profile contact with the templet, the valve assembly 42 connected thereto and upwardly from which projects a control plunger 43 bearable against floating housing 44. The follower assembly comprises idler roller 44' and arm 44" pivotted to the main frame or housing 51' at 45. Templet 40 is moveable transversely as arrow 45' indicates by means operated by tailstock assembly 17, and specifically the sprocket and chain assembly collectively designated 46 which extends within the I-beam 47, the chain being conventionally secured to tailstock assembly 17 so that upon rotation of sprocket 48, the screw-threaded shaft 49 keyed thereto is caused to rotate. This shaft, since it is secured against endwise movement, operates to move screw-threaded collar 50 transversely, such collar being connected via the standard 51 to templet 40. Parts 46 and 49 embody essentially what may be defined as variable response means.

The diameter of rings 11 is also influenced and the pressure exerted by roller pair 20 gradually varied to the extent desired, and described in greater detail hereinafter by means comprising the aforesaid valve assembly 42 and the plunger 43. These parts in general move upwardly to the same or to different extends due to the upward motion of bearing housing 44 under the ring-caused expansion upon the arbor 52 (which term may indifferently be used to describe parts 20, (including 38), 29 and 30).

MAIN DESCRIPTION OF FIRST EMBODIMENT

Having thus described the invention in summary, by terminology and expressions generally consonant with the claims hereof for purposes of interpretation, and having regard for considerations of mechanical and operational complexity involved, the invention in further structural detail is explained as follows:

The head-end guide assembly 16 is preferably suitably housed in as at 51', and is mounted on conventional structure already designated 19, which, however, to the extent shown comprises mainly the aforesaid I-beam 47. Head-end assembly 16 is secured immoveably thereon by conventional supporting structure such as generally designated 51' both against end-wise motion and rotation. Although fixed as just stated, 16 constitutes a special form of headstock, wherefore certain parts of it function as a special design of mandrel for reasons appearing. By contrast, tailstock assembly 17 is free to travel thereon via the rollers 53, and it will be understood that the I-beam 47 may be of considerable length to accommodate long poles.

Head-end guide assembly 16 includes the fixture collectively designated 54 which has previously been referred to in connection with the essential components of it namely the three pairs of spaced parallel stiles 34 through 36 arranged in 120° relationship to provide openings 55 therebetween, and the ways 37 aforesaid within which slide the bearing blocks 38 and 39.

The bearing block 38 is open or in the form of a frame (FIGS. 2, 6, 7, and 8) and might be described as the primary bearing block in virtue of the mechanism carried thereby. In this respect it differs from blocks 39 since it supports a vertical fixture collectively designated 56 which includes the aforesaid lever 21, compressed air cylinder 24 and the laterally extending support 57 for the same. Fixture 56 is journalled upon the pair of upper and lower supporting brackets 60 and 60' respectively. Hence it is to be understood that fixture 56 collectively is journalled for limited swivelling movement in a horizontal plane as indicated by double headed arrow 60" of FIG. 5.

Figure 3:
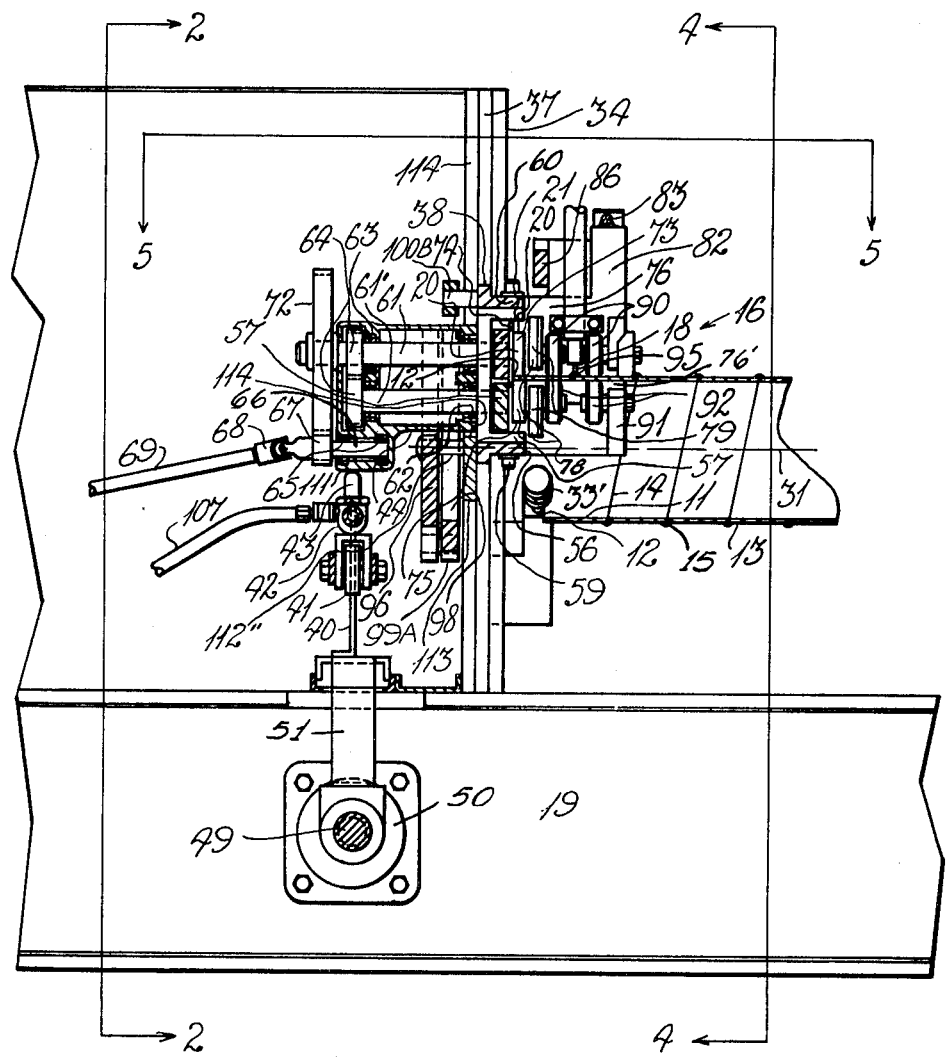
FIG. 3 is a section generally on the line 3—3 of FIG. 4.
Figure 6:
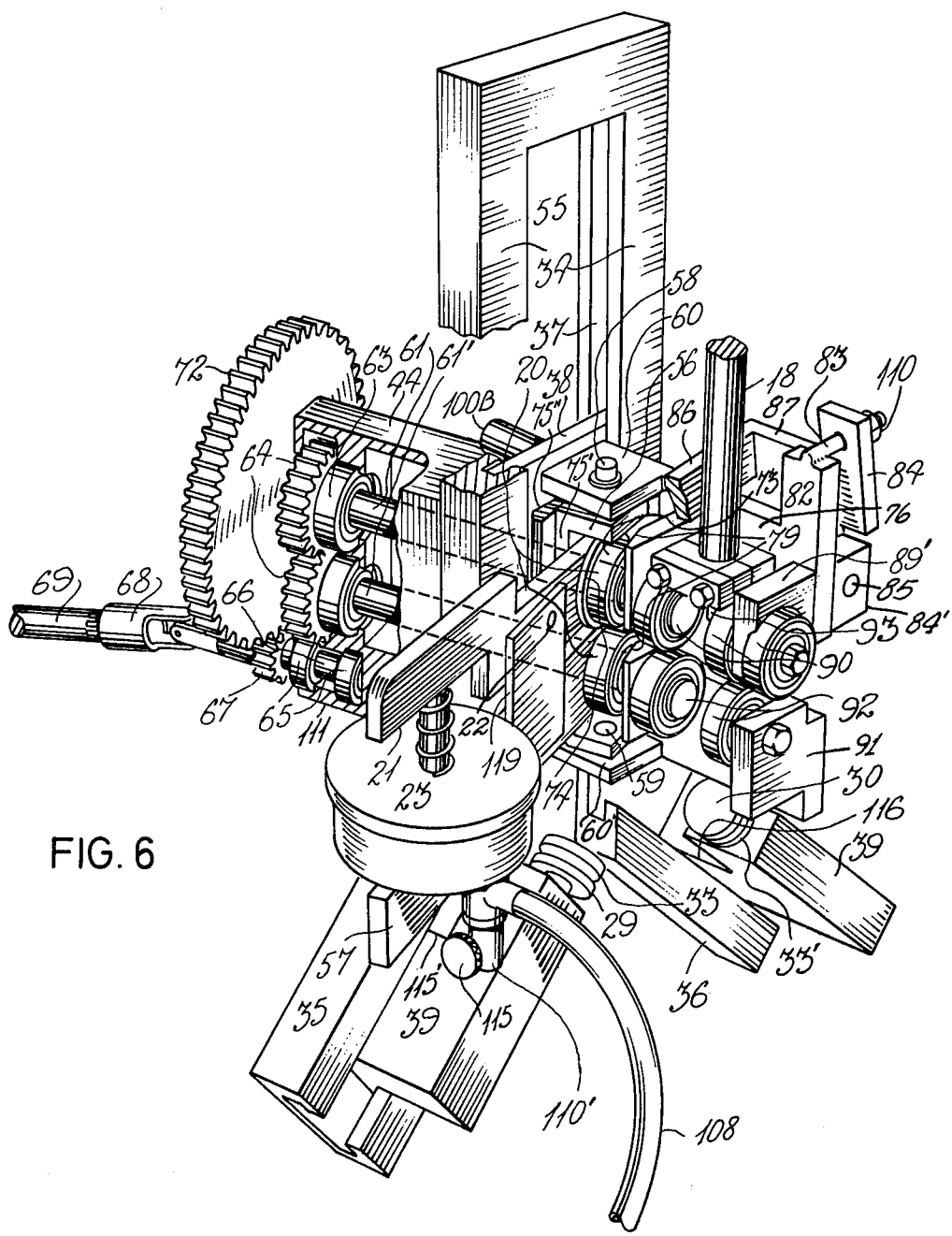
FIG. 6 is a perspective representation of the horizontally rotatable strip-stock draw rollers and angular strip-stock direction controlling assembly.

The pinch roller pair 20 is suitably mounted within the fixture 56, via the upper and lower drive shafts 61 and 61' secured thereto rearwardly which extend through back plate 75' of said fixture best depicted in the accompanying FIGS. 3 and 6 within the housing 44 which floats vertically with fixture 56, such drive shafts being journalled in the anterior and posterior roller bearing assemblies 62 and 63 respectively. Upon the posterior end of these shafts are keyed meshing spurs 64. Suitably journalled upon the roller bearings 65 within a lower projection portion of the housing 44 is a stub shaft 66 on which is keyed a drive pinion 67 connected to a universal joint assembly 68 from whence a telescoping shaft 69 extends rearwardly to a second universal bearing assembly 70 (which, as alternative to the shaft 69 may be sufficiently telescopic). This assembly is in turn conventionally connected to a prime mover 71.

Pinion 67 drives the spin gear 72 keyed to shaft 61, the anterior end of which shaft is keyed to the upper pinch roller 73 of the pair 20. Lever 21 is of the shape best to be seen in the accompanying FIGS. 4 and 6. Roller 73 is journalled for rotation to it and to the right of folcrum 72 with respect to FIG. 4. The essential profile support 57 is also shown in this Figure. Pinch roller 73 is provided with a posterior annular shoulder 74, the anterior face whereof snugly overlaps the rear surface of the lower roller 75. It is distinctly to be understood that all the parts carried by and included in fixture 56 swivel with it as stated, upon the stub shafts 58 and 59 though only to the limited extent indicated in the paragraph next following, together with housing 44 which is fixed to back plate 75' of the fixture 56, this housing extending through opening 75" in plate 38, and including also the gears 67 and 72.

Non-rotatably secured to bearing block 38 of fixture 54 via such as the forwardly extending vertical supporting plate 76 horizontally slotted as at 76' in registration with the nip 77 of the roller pair 20 are upper and lower metal blocks 78, each having a vertical bevelled posterior surface portion 79 termination upon the axial plane of 31. As a result of this disposition, it will be apparent that the roller pair 20 may be swivelled horizontally to the extent of lying parallel with surfaces 79.

Upon the opposite end of upper block 78 is a stripstock entry guiding roller 81. Post 82 projects upwardly from plate 76 or some other suitable fixed part, and welded to the summit of the same is a horizontally disposed screw 63. This screw transfixed the upper end of a transversely rotatable standard 84 pivotally connected as by an offset portion 84' at 85 for limited transverse rotation in a vertical plane. Standard 84 has welded thereto the downwardly angled L-shaped arm 86 via the horizontal portion 87 to be seen in FIG. 5. The lower end 88 of arm 86 carries a strip-stock directing roller 89, the purpose of which is to help direct and guide the leading end of a fresh roll of strip-stock through a spiral curve into the annular grooves provided in rollers 33 and 33' shown below it in the accompanying FIG. 4. Journalled in such as plate brackets 89' projecting transversely from the plate 76 is a set of three upper rollers 90. Below the horizontal plane of the nip 77 and journalled in substantially similar manne, i.e., as from the lower one of blocks 78, and the bracket 91, is a pair of lower rollers 92. It will be noted that the rollers 92, and the pair of rollers 90 above them, are on either side of the electrode 93 of the sigma welder, hence over the joint or junction of the initially formed ring 11.

Posterior of the transverse vertical planes of the fixture 54 are means collectively designated 94 for actuating the bearing blocks 38 and 39 thereof in slideable unison between the pairs of stiles 34 through 36, the latter in turn maintaining axial alignment between the tube center (axis 31) and the leading and trailing tube ends 28 and 95, which latter point (see FIG. 1) should be regarded as that at which the ring becomes the trailing end of completed tube inasmuch as it is at the apical point where the electrode 93 strikes that jointure is effected, although more generally speaking tube can be considered as commencing to be fabricated as it enters the nip 77. Means 94 in detail comprise a crank plate 96 of the shape clearly illustrated in the accompanying FIG. 2, generally of triangular configuration but with an enlarged bight 97 therein to accomodate housing 44. To the corners 98, 99, 100 of crank plate 96 are freely connected the links 98A, 99A, and the L-shaped link 100A, which last is thus shaped to avoid obstruction with housing 44 and is connected to the upper end of sliding bearing block 38 via stub shaft 100B. Projecting from plate 96 is also a lever arm 101 by means of which the crank plate 96 (and also of course the blocks 38 and 39 which are pivotally connected at 102 to the outer ends of links 98, 99, and 100) may be rotated and moved slideably respectively.

Spring 102 suitably anchored to the mounting structure and to the corner 103 of plate 96 counterbalances the weight of the pinch roller assembly and associated parts to maintain the total centering assembly balanced. (The parts comprising most critically numbers 20, 38, 39 and 96 may here be defined usefully as the "diameter variation sensing means" of the first embodiment)

Sprocket chain 104 is secured by any suitable means to tailstock assembly 17 via the upper or lower run thereof whichever is preferred. It extends within one of the channels 105 of the I-beam 47. Screw-threaded shaft 49 is keyed to the sprocket 48 as already stated, and terminates at the outer end with a hand crank 106 whereby it can be rotated manually when desired and at this point it may be stated that any convenient form of brake means may be applied upon shaft 49 to retard the rotation thereof under the influence of sprocket 48 and hence retard or set up resistance in tailstock assembly 17 against being too easily pushed to the right with respect to the accompanying FIG. 1 by tube 13 to assist in achieving a tight wrap as between each ring and the next adjacent at the location of the welding electrode 93 particularly.

Tube 107 is connected to a source of air pressure and supplies the same to the valve assembly 42, tube 108 communicating between the valve and pressure cylinder 24.

OPERATION OF FIRST EMBODIMENT

In the novel process of manufacturing spiral tubing from flat stock in which the adjacent edges of each ring abut and are co-planar upon any given axial plane, edge treatment, most desirably in the form of edge area milling, is necessary and believed to be novel. Accordingly, strip-stock 10 approaches the head-end guide assembly at an angle such as that depicted in the accompanying FIG. 1 such angle of entry depending on the width of the stock and the diameter of the tubing desired.

The fixture 56 rotates freely to the extent required within its limits as already described. As a result the pinch roller pair 20 is automatically skewed to the extent necessary about the vertical axis of shafts 58 and 59.

Only the area of trailing edge 12 of the strip-stock 10 enters between the nip 77 of the roller pair 20, the remaining width of the strip simply being held snugly between the upper and lower sets of rollers 93 and 92 respectively. The effect of the trailing edge area being nipped and put under pressure, having regard for the presence of flange 74, is to cause the trailing edge metal to be stretched, and, as it were, flow ahead thus continuously slightly distorting the strip in its plane and curving it slightly so that trailing edge 12 is lengthened in comparison with leading edge 26.

Figure 4:
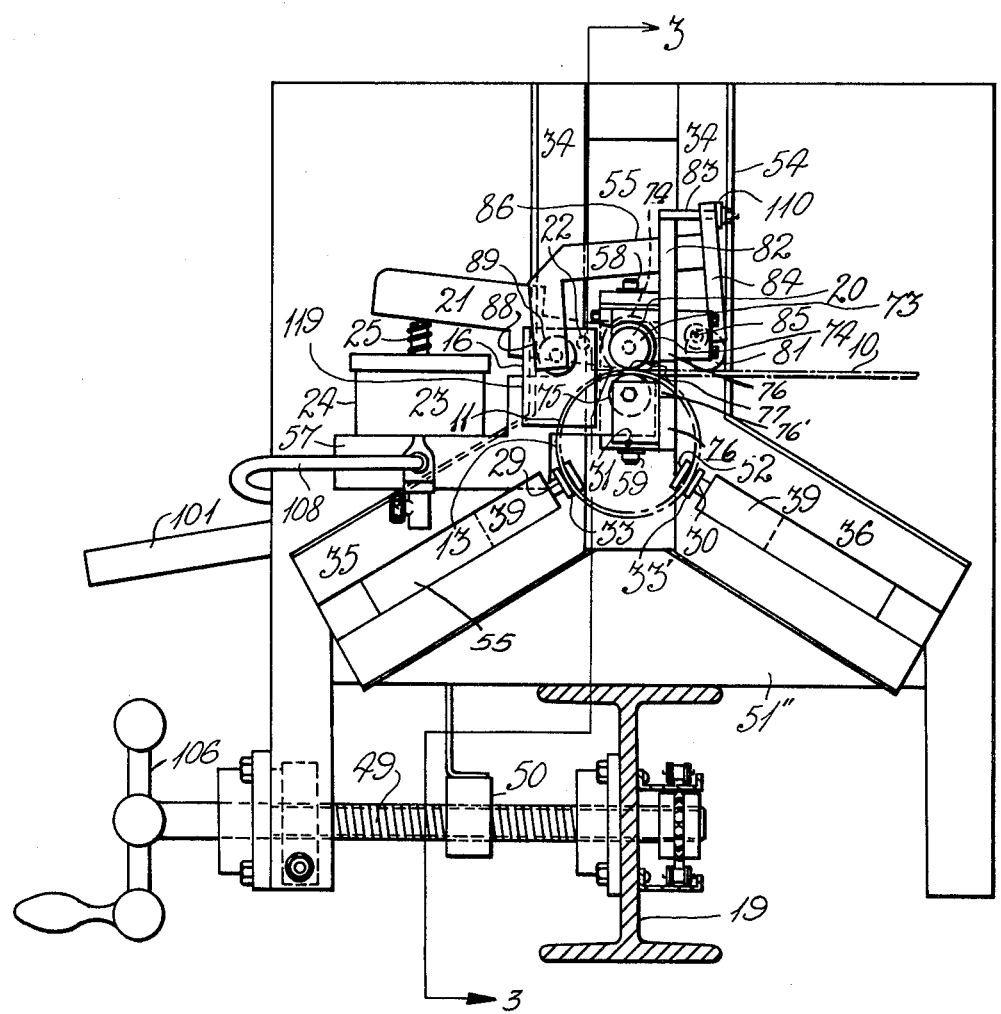
FIG. 4 is a section generally on the line 4—4 of FIG. 1, and 4—4 of FIG. 3.

The directing roller 89 may be rotated about pivot point 85 on the fixture formed by parts 83, 84, and 86 best depicted in the accompanying FIG. 4, the adjustment thereof being effected by the nut 110. By this means the "lead strip" of a new pole can be assisted down and around into the anterior segments of the annular grooves best seen in the accompanying FIG. 4 upon the perimeter of the rollers 33 and 33', it being understood at this point that the roller 33' is somewhat in advance of roller 33 having regard to the initial spiral of leader strip which is being introduced to the machine. The stock is led on up between the upper and lower rollers 90 and 92 respectively. As soon as the extreme leading end of the lead strip passes between the last mentioned rollers, the sigma weld can be energized and the first spiral ring closed at the leading and trailing ends of its trailing and leading edges. Thereafter, the roller 89 performs no useful function and must be elevated rotatably out of the way so that it does not intercept tube as it is commencing to assume large diameter. From this point on a tube is automatically self-fabricated and is rotated by the pinch roller pair 20. It should, however, be mentioned that before the operation can be considered as properly self-sustaining, the "leader" aforesaid, i.e. the leading end, should be introduced to the freely rotating tailstock assembly spindle 32. After that the tailstock is slowly pushed to the right with respect to the accompanying FIG. 1 as already explained and the sprocket and chain assembly 46 commences to move carrying the templet 40 in the direction of arrow 45 or rightwardly with respect to the accompanying FIG. 2 to control the pressure which piston rod 25 exerts upwardly against lever 21 about pivot point 22 and downwardly upon the shouldered roller 73. Reduction of such pressure, obviously results in reduction of the milling depth.

In this connection, although it has been stated that the strip-stock employed is both "initially essentially parallel-edged and straight-edged", it is intended by this expression that any interlocking co-planar edge configuration be included such as might tend to hold together two adjacent edges to some extent and delay or in some cases perhaps even eliminate the necessity for welding if the edge configurations were so spaced as to be capable of co-planar snug interlocking.

At this point it is also useful to re-state more fully, for the teaching of the present inventive technique, that the supply roll containing the strip-stock to be employed should preferably lie horizontally at some point conveniently adjacent to the present machine. By lying horizontally and thus peeling off, it will necessarily be twisted 90° for entry between the pinch rollers 20. When the supply roll thus lies horizontally with the strip vertically on edge, it is not necessary that it be perfectly aligned to take care of varying angles of entry, one of which is depicted in the accompanying FIG. 1, as would be the case if the roll were disposed vertically about a horizontal axis. If it were thus disposed of vertically it would bind against the flanges of the associated drum, or perhaps come prematurely off the roll, and in any event would not so readily accommodate itself to true entry as desired, but would tend to "veer off" unless perfectly aligned with the point of entry between pinch rollers 20.

As a result of the foregoing explanation, it will be apparent that, as the initially formed ring grows in diameter, the two floating guide roller assemblies 29 and 30 slide outwardly, while the pinch roller pair 20 slides upwardly. Hence all three contact points of the stock with the head-end guide assembly will move radially outwards with respect to tube axis 31, due to the expanding pressure of the trailing-tube-end, and equally, so that these parts are correctly describable as a mandrel of unique design for the present purpose.

The housing portion 111 is that which is actually contacted by air pressure control plunger 43. Once the first or "lead" strip of tube is welded, as already stated, the process of tapered tube fabrication is substantially self-sustaining. As the pole diameter increases, so the mandrel spreads because the stock rotates in a perfectly centered spiral within the grooves of the guide rollers 33 and 33', and the nip 77 of roller pair 20. Tube formed with this machine can be cylindrical, straight-tapered, and convex or concave tapered, or if desired in one and the same tube, provided there is no diminution of diameter from a preceding diameter. For at least convex or concave tapered tube, strip-stock trailing edge pressure variation is essential to provide greater or less stretch on the trailing edge and consequently tighter or slower curvature respectively of the strip-stock in its plane according as whether the desired taper is to be straight, concave or convex.

Figure 2:
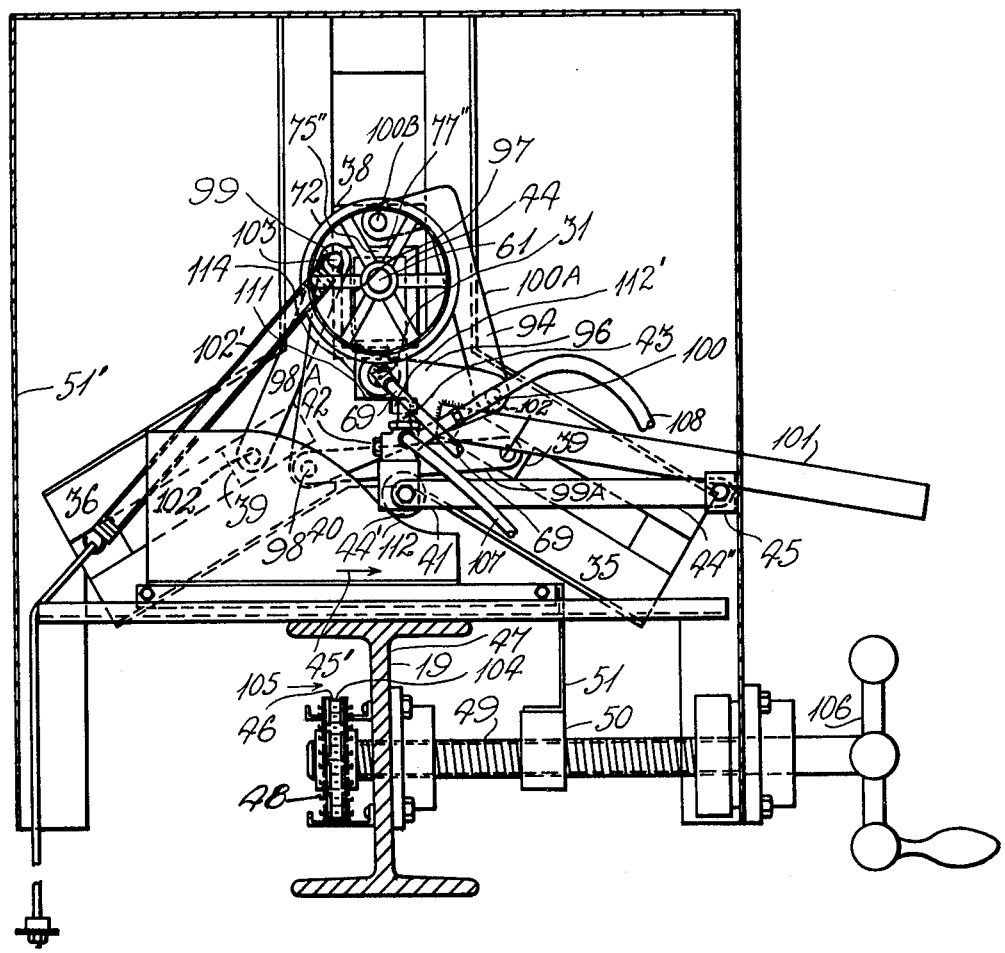
FIG. 2 is a cross-sectional elevation on the line approximately of 2—2 of FIG. 1 and 2—2 of FIG. 3.

Therefore the templet profile 112 dictates pressure change as it moves to the right with respect to the accompanying FIG. 2 by causing the plunger 43 to be depressed against housing portion 111 and thus to permit pressure increase in cylinder 24 above the volume which normally bleeds therefrom through valve 110'. If air is permitted by relaxation of plunger 43 to escape through valve 42 in volume which is in excess of the volume of the aforesaid bleed-air, the pressure between roller-pair 20 would decrease and the strip trailing-edge curvature will lessen.

However, while 43 is bearing upwardly against the underside 111 (FIG. 3) that underside is also ascending as the tube diameter increases (FIG. 5) and the ribbon stock curvature decreases. The interplay of these two actions may not always be perfectly synchronized. In such cases the entering round of stock might not lie in perfectly smooth superificial contiguity to the next one. A slight step up or down might then occur at the joint of the two. But since the stock is moving between the rollers which float (FIG. 6) with the housing 44 and the last complete round of stock being formed is centered at three equi-distant points (FIG. 4), any slight departures from the precisely desired tube-taper are immediately corrected by an almost imperceptible stock-induced rise in the housing 44 (and expansion of the mandrel). This of course is at once felt by the plunger or valve 43 which therefore also rises imperceptibly and momentarily and to that extent releases the very slight amount of pressure between the pinch rollers necesary to allow immediately the required degree of stock regulation for increased (or decreased) tube diameter. Referring to FIGS. 2, 3, 6, 7 and FIG. 32 in particular, assuming the fabrication of a straight-tapered pole, such fabrication starts with valve 43 riding the low end of templet profile 112. In general the templet leads in the sense of signalling what pressure is to be applied by the pinch roller pair 20. The distance 120 between templet profile 112 and floor 111 varies slightly as the diameter of the "making" end of the tube increases. Overall the diameter increases the more valve 43 opens. Otherwise than to the extent 111 and 112 diverge or converge due to pressure variation they rise in unison. While the tube diameter is small turns or coils will be generated faster and as a result will move lengthwise faster. The templet will likewise move under the influence of chain 46. As diameter increases and linear speed decreases the profile will rise faster, likewise floor 111, and roller pressure will be designed to ease off with the space between floor 111 and profile 112 increasing slightly thereby opening valve 43 somewhat and reducing edge-squeezing roller pressure. It will be appreciated however that only a general statement can be made on such a sensitive mechanical interaction as in effect takes place, and circumstances will depend upon such conditions as slope, starting diameter, gauge and width of metal and the like.

While the tube is being formed the projected weld of the spiral joint of the turns is ground off and the tube polished by conventional means.

Figure 5:
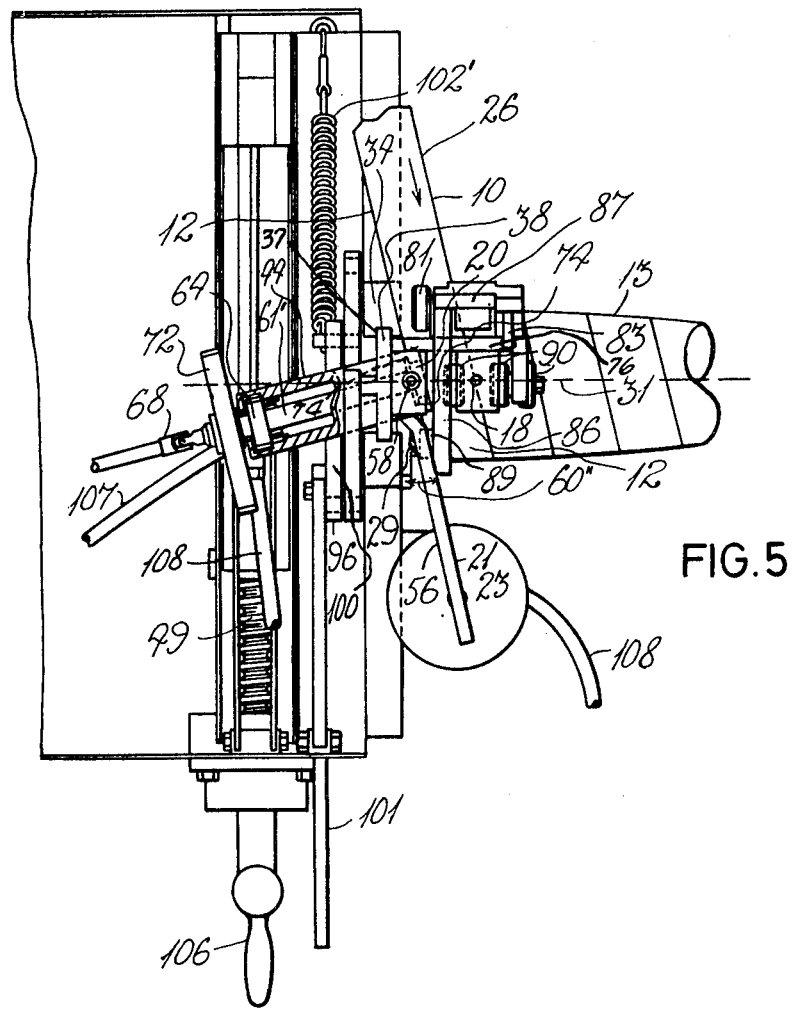
FIG. 5 is a plan view of the head end guide assembly generally upon the line 5—5 of FIG. 3 except that the tube is shown as cylindrical.

From FIG. 3 it is to be seen that it is a small part of the floor of the housing portion 111 which is contacted by plunger 43. In FIG. 2 a socket or thimble 112' open on the underside is seen to be secured offset with respect to the housing to accommodate the said plunger. This may alternatively be a cavity in the metal of the floor of the housing. Its purpose is to help retain the plunger vertical, and from FIG. 2 it will be seen that the socket accommodates the plunger loosely due to the fact that housing 44 may rotate a few degrees as shown in FIG. 5 for example. If however, it is desired to accommodate the plunger snugly, the socket or the cavity can be elongated and curved to the swing of the housing.

Rod 101 is shown in FIG. 2 to be welded to plate 96. In this Figure also, the edge portion 97 of crank plate 96 is shown to avoid boxing 44. However, the purpose of boxing 44 is mainly to enclose shafts 61 and 61', together with the bearing assemblies 63 and spurs 64. The lower part of the housing which is the rear part best shown in the accompanying FIG. 3 also accommodates the bearings 65 and stub shaft 66 as a result of which it will be seen that housing 44 is of special shape, and can if desired in large part be dispensed with so long as it acts at least a support for the parts just mentioned. Thus, from FIG. 2 it will be seen that the more massive lower part of plate 96 is behind (with respect specifically to this view) the rear part of the housing where it projects downwardly to accommodate such as shaft 66 for example.

The important point to note is that plate 96 is mounted for rotation upon stub shaft 112" upon the axis 31, such axis as already mentioned being invariant. Stub shaft 112" extends through the metal 113 spanning the stiles 34 (see FIG. 7), and resides on the plane of the rear guide portions 114 adjacent the pair of central ways 37.

The bridging piece 113 through which stub shaft 112" extends rearwardly and which spans the opening 55 terminates in a sill 114 which, as indicated by FIG. 3, limits the downward travel of housing 44. Above it and in the plane of the ways 37, bearing block 38 may travel vertically, the forwardly projecting extension of housing 44 in the form of the bracket 56, extending through opening 75".

It is to be noted that lead of valve 110' is provided with conventional adjustment means 115 for use according to circumstances and the particular job. FIG. 6 also well illustrates what has already been described in connection with the manner in which the guide rollers 33 and 33" are disposed out of transverse alignment by the difference in outstepping as at 115' compared with 116, of the blocks 39 to allow for spiralling of the first ring being formed between the roller pair 20.

It will be appreciated that the support bar 57 carrying the source of power 23 is secured as by lap or butt-welding for example to the back plate 75' so as to be rigid but rotate as indicated at 60 in FIG. 5. The fulcrum or pivotal point 22 of lever 21 extends through plate 119 (of which there may be a pair for extra strength on either side of member 21). The plate or plates 119 may be welded to support 57, these parts being best shown in the accompanying FIGS. 4 and 6.

PRELIMINARY STATTEMENT OF SECOND EMBODIMENT

The machine illustrated in FIGS. 9-25 and 32 is adapted to fabricate tube continuously and to sever it into predetermined lengths automatically. While capable of being profiled for fancy annular convexities and concavities such as illustrated in FIG. 29 (very much exaggerated as to the steepness of such convexities and concavities as regards the capability of machines which have been experimentally built, but believed not beyond the capacity of a production machine of wider tolerances), when producing tapered pole-lengths for such as lighting standards and the like, these lengths come off the machine in alternate diametrically diminishing and increasing units which are severed at the point where diametrical decrease changes to diametrical increase and vice-versa, the diameter being governed wholly at the location of the strip-stock fabricating means occupying the left end of FIG. 9 and best illustrated in FIGS. 10-15. Machines built to date are designed for fabricating tube between generally a minimum of 3 inches diameter and a maximum of 12 inches diameter using 4 inch wide stainless steel strip stock between 0.050-0.125 so that one revolution of the tube equals 4 inches of longitudinal travel.

INITIAL SUMMARY DESCRIPTION OF SECOND EMBODIMENT

Describing the subject-matter hereof in terms generally consonant with those by which the same has been defined and claimed as an invention, the novel material used by the present machine in the fabricating of continuous tube 130, discrete tubes or cavitated articles is strip or ribbon stock presently but not necessarily of metal which either as a step in said fabrication or as delivered to the machine (in rolls for example) is characterized by having opposite elongated edges 152 and 154 (FIG. 27) which are observed to be correspondingly curved in the common plane which spans said edges when said stock between said edges is lying flat.

Another novel characteristic of the material as used for the purpose here intended, either combined with or independent of the curvature in the plane referred to in the last preceding paragraph resides in the fact that one edge-area 158 may be thinner than that of the opposite edge-area 160. In general the thinner edge 154 is the convex edge, the opposite being correspondingly concave.

The novel product is the aforesaid material as formed into continuous tube or a cavitated article primarily as a consequence of said material being wound in to a set of spiral and contiguous butt-bonded rings. Such tube or article is smooth on one surface (generally the internal surface) but stepped as at 162 (FIG. 26) on the other (generally in the order of 0.001 to 0.005 inches) due to the thinning of edge 154 upon the exterior surface 164 thereof. If the opposite inner surface were thinned the inner surface would be the one stepped and the exterior smooth. When a built-up weld or bond is employed the exterior spiral stepping may help in providing a suitable trough for the same. The invented process includes the step of treating strip-stock so as to impart curvature to it in its plane as viewed flat, and joining adjacent edges of adjacent spiral rings 154 in edge-abutting relationship, meaning non-lapping relationship. It includes the step of lengthening the stock at least in the vicinity of one elongated edge thereby curving such edge 154 convexly and the edge 152 concavely in the formation of continuous tube (FIG. 27).

The invented process also includes the step of biasing or stressing strip-stock which has been curved in its plane, and while being wound into spiral rings, into snug edge contact with the ring next ahead and joining the rings in edge-abutting relationship. It also includes the step of bonding strip-stock into rings formed of the material herein described at least in the vicinity of the stations at which the rings are being fabricated substantially immediately after being so fabricated and causing the tube to rotate about its longitudinal axis under the compressive effort of the rotary end-thrust on the strip-stock after bonding and as the stock is fed onto and forms the trailing end of the tube. The invented machine has strip-stock fabricating means collectively designated 166 and this expression, according to the context may or may not include the means collectively designated 168 for applying stock-thickness-reducing pressure to at lease the trailing edge-marginal area 154 of the incoming strip-stock 170 (FIGS. 14, 16, 20 & 27).

Figure 11:
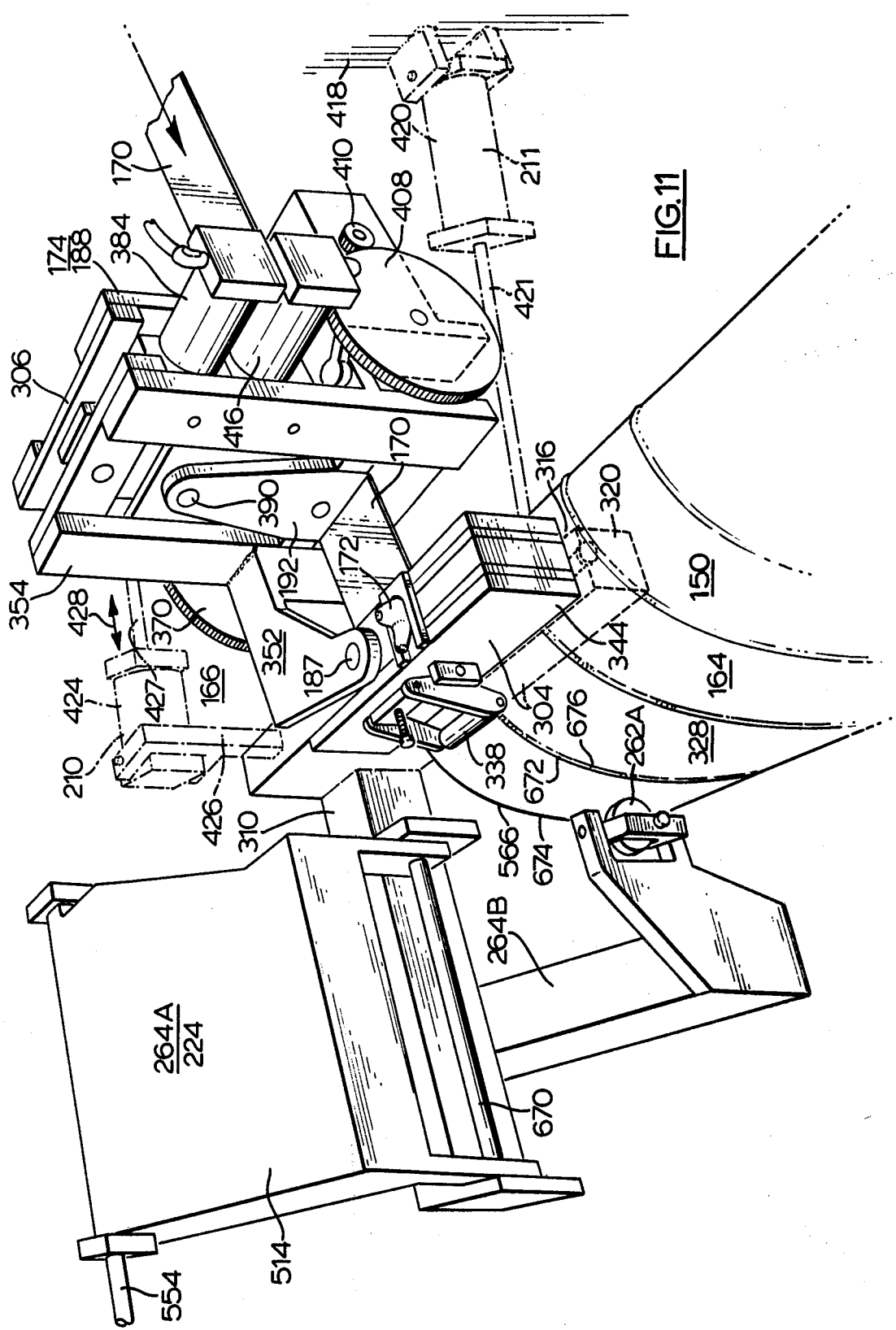
FIG. 11 is a perspective representation of the tube fabricating head.
Figure 22:
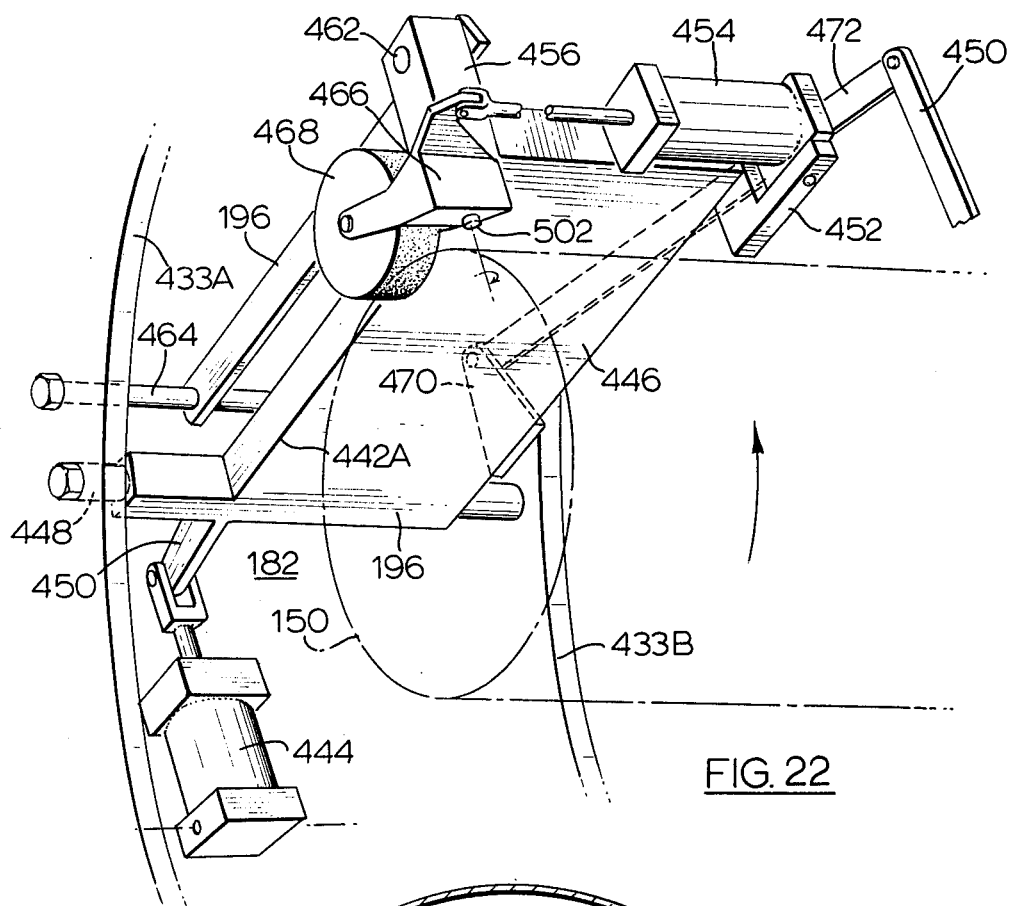
FIG. 22 is a fragmentary perspective detail further illustrating first tube supporting means of FIG. 21.
Figure 24:
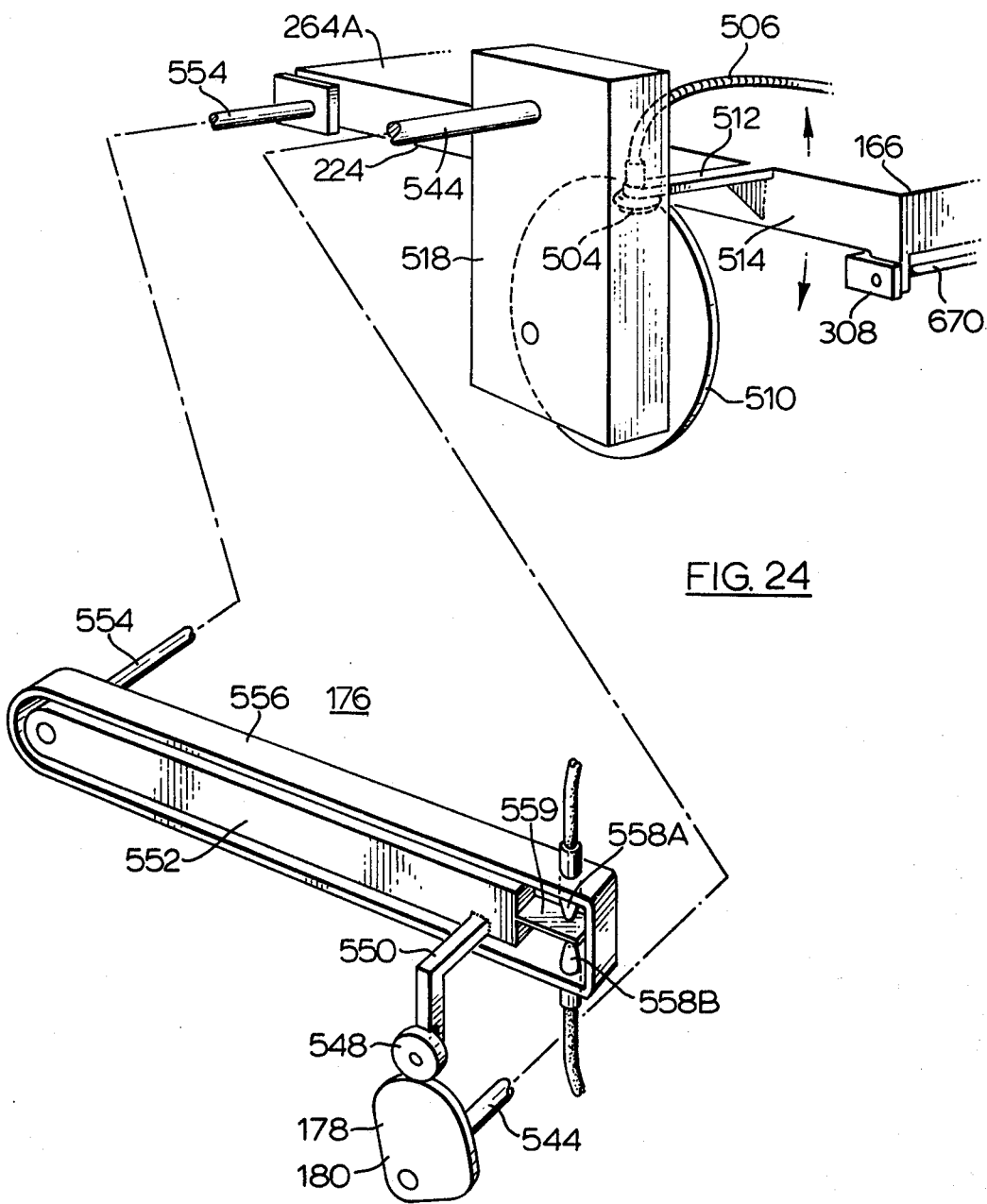
FIG. 24 is a pictorial schematic representation of the primary gradient control means for governing tube diameter variation and feedback from the pinch-rollers to the floating anvil assembly of FIG. 19.

The machine also includes means generally designated 172 (FIG. 11) for edge-joining the rings 164. In FIGS. 11, 22 and 24 the means hitherto designated 168 are shown to be integers of an assembly of greater conceptual scope and embodying strip-stock end-thrust means generally designated 174 (FIGS. 11 & 14) for applying non-right angular compressive stress to said strip-stock relative to the longitudinal tube axis so as to cause rotary motion of said tube while being fabricated, and relative longitudinal motion between said tube and said machine.

From this it will be understood that although parts 166, 168 and 174 are shown as stationary, they might be movable generally from right to left with reference to the accompanying FIG. 9 while the tube rotated without longitudinal motion in a modified version of the present inventive concept.

The machine also includes tube-taper variation governing means, or tube diameter information feed-back means collectively designated 176 (FIGS. 24 and 25). Same is actuated by a rotating templet or governor-cam 178 (FIG. 25) movement to which is imparted through a reversible gear train assembly set in motion by a drive wheel movable over the face of the shown wheel (which is part of said train) under the influence of a flexible cable from means 168. The course which the drive wheel follows is dictated by motion of one of the component parts of 166 responsive to the changing diameter of the tube or article 150. Reversal of the governor-cam means 178 causes opening or closing of one or the other of two opposed valves of a compression cylinder assembly whereby the bias of one of the elements of the means 168 is reversed to effect squeezing, hence lengthening and convexly curving of the opposite edge of the strip-stock 170 to that which was previously being squeezed. As a consequence the tube diameter will now reverse from the increasing or decreasing (or neutral) diameter it was previously assuming.

The contents of FIGS. 24 and 25 may also be broadly defined as gradient responsive means 180 meaning predominantly the integer 178 which may take a variety of forms alternative to the rotary form which is shown. The fabricating means 166 are contained within the enclosed left end of the housing shown in FIG. 9. Such means and means 182, 184 and 186 (FIGS. 9, 10, 13, 22 and 23) support the tube 150 at locations distant from that of fabricating means 166.

The machine fabricates strip-stock which is curved in the plane on which lies its opposite longitudinal edges into spiral rings the edges of which are in abutting relationship, essentially by feeding stock 170 through the means 168, such means being capable of swinging about bearing 187 (FIG. 11) to a limited extent horizontally due to being journalled in means collectively designated 188, (co-designated 174) for directing the strip-stock toward edge-joining means 172. Since means 188 contain means 168 it constitutes means for varying the strip-stock curvature and permits limited self-rotation during the strip-stock feeding process whereby the obtuse angle to the longitudinal axis of said tube at which the stock enters may be varied according to predetermined variations in the diameter of the associated tube 150.

The pinch-rollers 190 constitute means for reducing the thickness of either opposite edge-area of the strip stock 170, thereby lengthening it and curving it convexly in the plane. Means 192 operate to bias at least one of said pinch-rollers against either of said edge-areas while tube is being fabricated.

Figure 10:
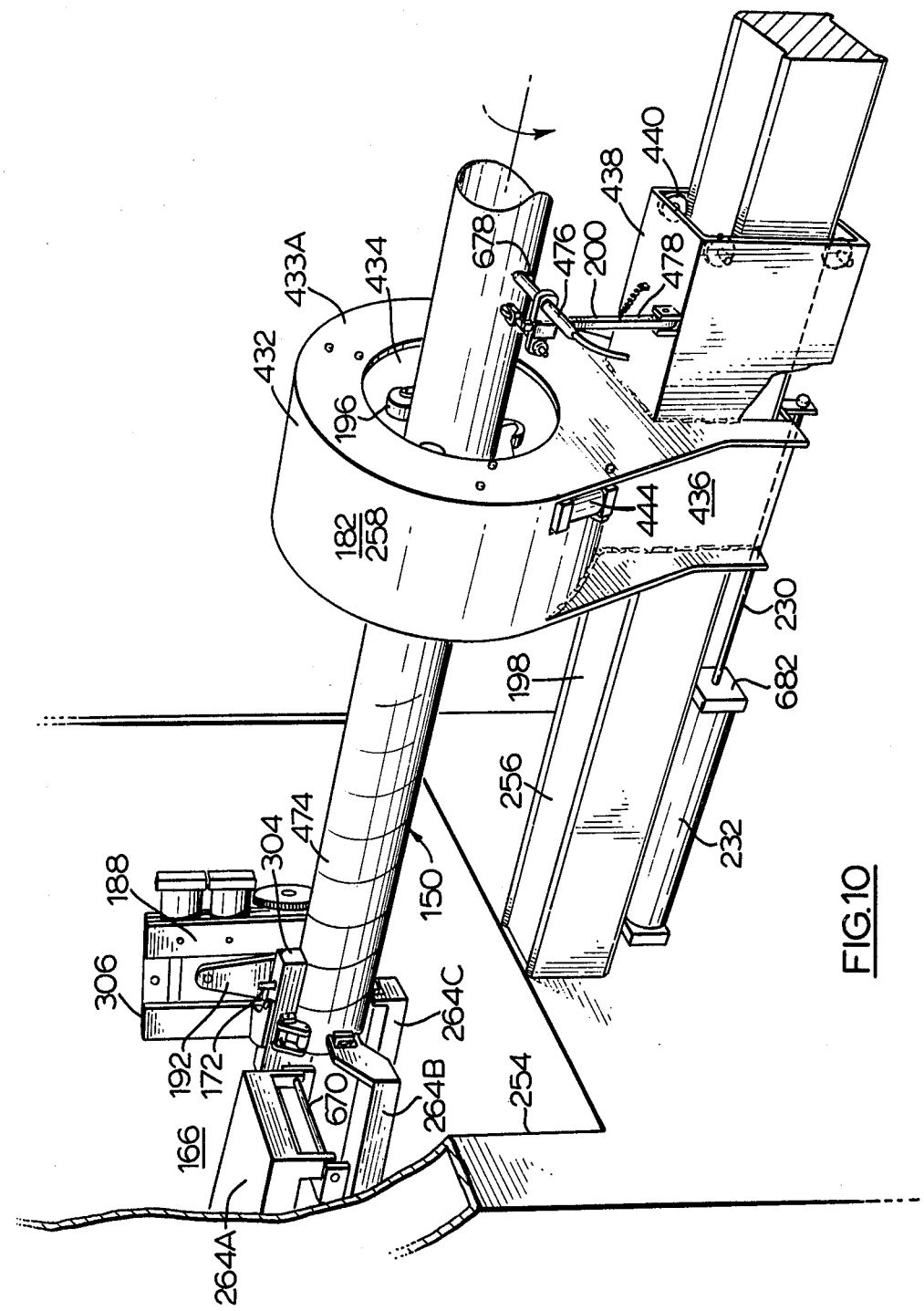
FIG. 10 is an enlarged perspective representation showing the external housing of the first tube supporting means.

The fabricating means 166 in addition to including the pinch-roller means aforesaid includes circumferentially arranged radius equalizing roller means for the trailing end of tube 150 relative to supporting means 182, 184 and 186 collectively designated 192. Supporting means 182 includes roller radius equalizing means 196 (FIGS. 10 and 11). Means 194 (FIGS. 11 and 14) and 196 cooperate in maintaining the axial horizontality of tube 150. Mounting structure generally designated 198 for supporting the fabricating means 166, and tube supporting means is to be seen in FIGS. 9, 10 and 13. The means for redistributing the material of which said strip-stock is formed for imparting curvature thereto in the plane has already been designated 168. The means for varying the axial angle between the members of the pinch-roller pair 190 for increasing pressure on one edge-area of the strip passing between them has already been designated 192. The automatic means for varying strip-stock thickness, and the tube gradient responsive means may, subject to context be considered as including parts 178 and 190 (FIG. 25).

Means collectively designated 200 (FIGS. 10 & 25) are provided for automatically severing successive lengths 202 of tube stock at the junction 204 of their diametrical reversal (FIG. 25). Such severence is initiated by the longitudinal motion rightwardly (with respect to FIG. 25) of the tube stock by means of which microswitches are tripped to actuate, through lead 206 the tube-taper reversing gear means or assembly 208. As will be seen best by reference to FIGS. 11 and 14 tube 150 is rotated by the entry of strip-stock 170 to the strip-stock fabricating means at an obtuse angle to the longitudinal axis of the tube, means 210 and 211 respectively being in the form of two compressed air cylinder assemblies provided in the vicinity of said fabricating means for urging the ring 212 (FIG. 14) in the process of being fabricated toward the next adjacent fully fabricated ring 214 to effect a snugly abutting relationship at the locus 216 of bonding the adjacent edges of said rings and for biasing the centering means 194. Means 192 (FIG. 16) take the form of a pair of rocker arms 218 connected to a rocker boxing 220 within which is journalled the upper one 222 of the pinch-roller pair 190. Such means function to reduce the thickness of either of the two opposite edge-areas of the strip 170 and lengthen and curve it convexly in the plane by biassing at lest one roller against either strip edge-area.

The circumferentially arranged centering means 194 comprises a set of four generally horizontally disposed arms 224 linked together as at 226 (FIG. 12) so that they all move radially outwards from an assumed centre equidistantly at their distal ends and hence retain fabricated tube 150 on center between them. The roller radius equalizing means 196 (FIG. 21) consists of a set of linkages adapted for a similar purpose. The rollers 228 thereof are however capable of being rotated by compressed air assemblies from the position shown in FIG. 21 sufficiently to rotate parallel with the spiral rings of the tube 150 so that the latter can move longitudinally without carrying the means 196 with it along the mounting structure 198. In the shown position the rollers are in 90° opposition to the tube axis and hence 196 must travel with the tube. It so travels during severance of lengths of tube (see FIG. 10), the severance being effected as the tube makes one revolution, by means of the shown cutting torch. At the conclusion of severance the rollers 228 are so biassed as to be returned leftwardly with respect to FIG. 10 under the pull exerted by rod 230 influenced by compressed air cylinder assembly 232, while maintaining centering, supporting contact with the tube.

MAIN DESCRIPTION OF SECOND EMBODIMENT

In this part names and numerals used elsewhere in this specification may be replaced by other numerals and other names for such further disclosure as seems requisite or desirable.

The machine collectively designated 250 (FIG. 9) is mainly contained within the rectangular housing 252. Carried upon suitable supporting structure within the enclosure 254 is the strip-stock fabricating head assembly 166. Projecting longitudinally within housing 250 external to enclosure 254 is a horizontal supporting track 256 for carrying the longitudinally movable intermediate tube supporting and severance facilitating assembly 258. External to the housing and suitably mounted upon the shown blocks are the second and third tube supporting means already identified 184 and 186 respectively.

Figure 12:
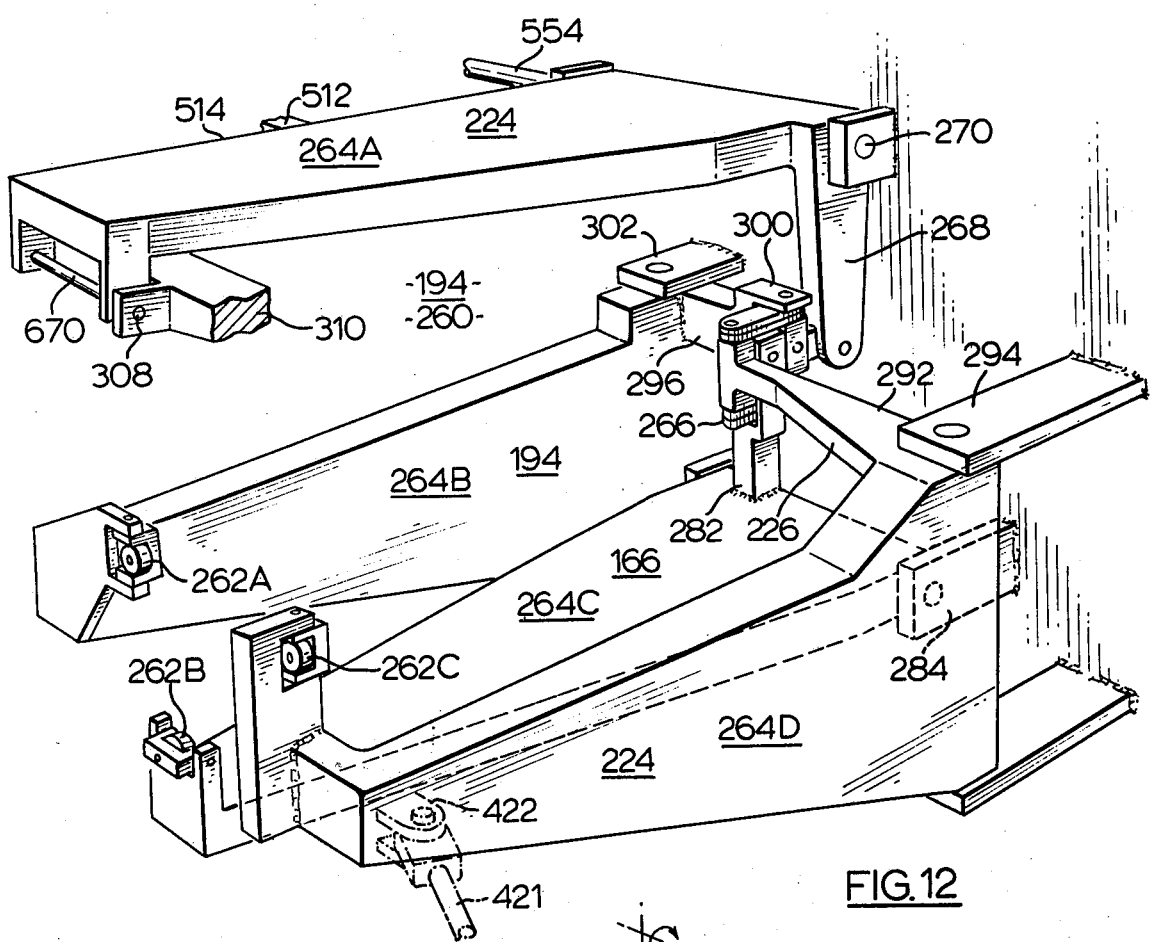
FIG. 12 is a perspective representation of the fabricating head means.

The strip-stock fabricating means 166 embodies firstly the diameter variation sensing means or tube centering means for floating roller chuck assembly 260, (FIG. 12). It includes four arms so mutually arranged that the effective distal ends thereof each carry a tube contacting roller 262A, 263B, 262C, and a roller 262D (FIGS. 19 and 25) which contact the tube 150 at opposite horizontally diametrical points and vertically opposite diametrical points, in other words, at 90° intervals, the aforesaid arms being identified 264A, B, C and D.

Figure 13:
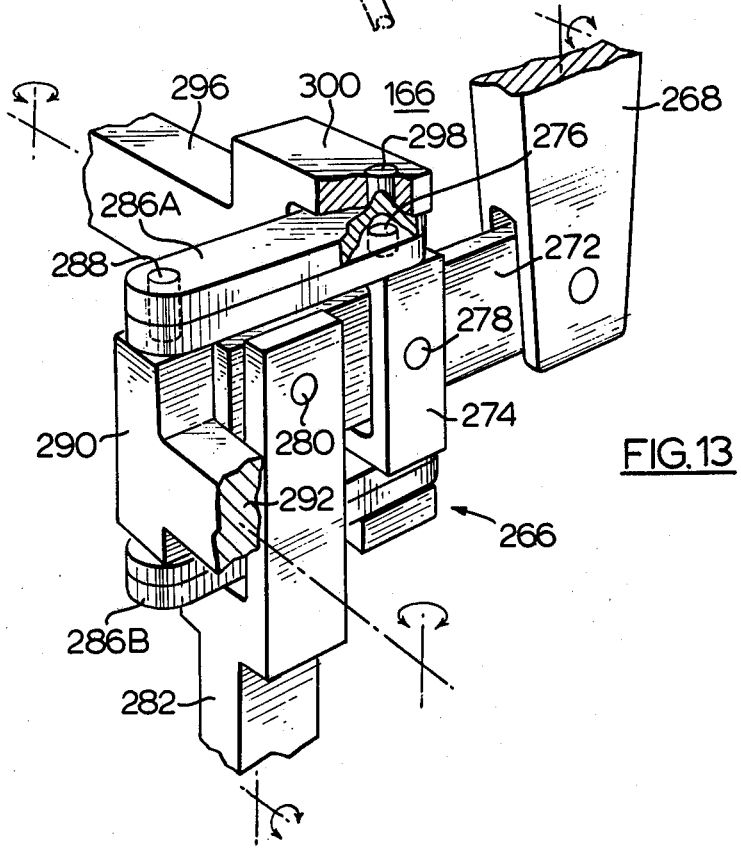
FIG. 13 is an enlarged fragmentary representation of the universal floating knuckle complex of FIG. 12.
Figure 19:
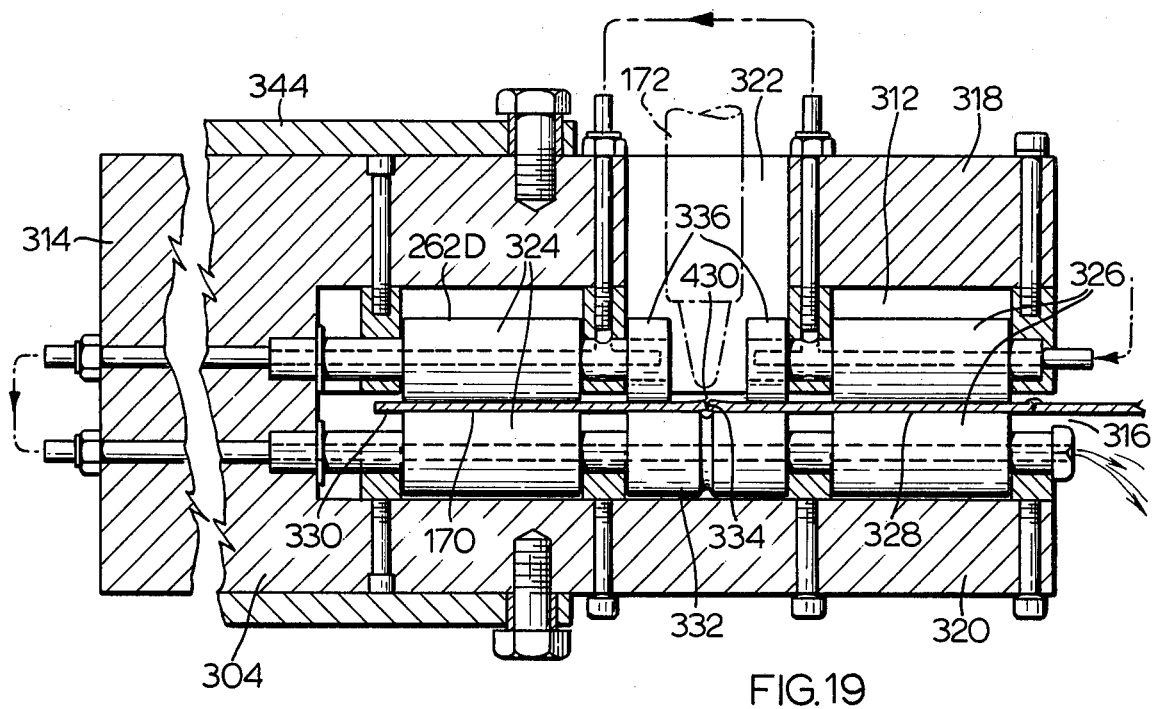
FIG. 19 is a longitudinal cross-sectional elevation of the floating anvil assembly forming parts of the floating roller chuck assembly means of FIGS. 11 and 12.

The tube centering roller assembly of FIGS. 12 and 13 (see also FIGS. 11 and 14) is so designed that all four rollers 262 contact the tube 150 simultaneously and with equal pressure about a constant tube axis under the influence of a universal floating knuckly complex collectively designated 266 (FIG. 13), the rollers 262 being trunnion-journalled in the swivelling assemblies shown so as to follow the helical winding of the strip 170 into tube form and stepped progressively counter-clockwise toward the loading end of the machine in conformity with the spiralling direction, starting with the topmost roller 262D (FIG. 19). In practice all four rollers should substantially contact the trailing edge of the last completed ring it being thus recognized that only the roller 262B (FIG. 11) actually carries the load of the tube rear-end although the rollers 262A and C provide support for the flanks of the tube rear-end.

The knuckle complet 266 comprises in combination the crank arm 268 integral with 264A and hinged at 270 to a wall of enclosure 254. To the crank arm is connected link 272 having the ring or clevis 274 encircling same, 274 having a pair of trunnions projecting vertically from the opposite ends thereof, and being pinned to link 272 at 278. Hingedly pinned at 280 is a distance bar 282 the lower end of which is welded to arm 264C, such arm being hingedly connected by the brackets 284 to the aforesaid wall of enclosure 254.

Over and under-lying link 272 are two pairs of scissor links 286A and B. A common end of both these pairs is connected by trunnion pairs 288 to the cross-end 290 of link bar 292 integral with arm 264D which is secured by the bracket pair 294 to the aforesaid enclosure end wall.

Link bar 296 is pinned at opposite ends as at 298 by way of the clevis 300 thereof to the outer ones only of the upper and lower scissor link pair 286 while trunnions 276 are pinned only to the corresponding ends, and substantially coaxially to the inner ones only of said pairs. Link bar 296 is integral with arm 294B which is hingedly connected by the brackets 302 to the aforesaid wall. From the foregoing it follows that if for example the four rollers 266 contract upon a pole the diameter of which is diminishing as it is being fabricated, crank arm 268 will move counter-clockwise with respect to FIG. 12. This will pull link 272 to the right (FIG. 13). Bar 296 will also move counter-clockwise and with it arm 264B while the outer links of the pairs 286 will rotate about the trunnions 288 moving slightly out of coaxiality. At the same time bar 262 will move slightly clockwise the lifting arm 264C. Bar 292 will also move slightly clockwise and impart similar motion to arm 264D.

Figure 15:
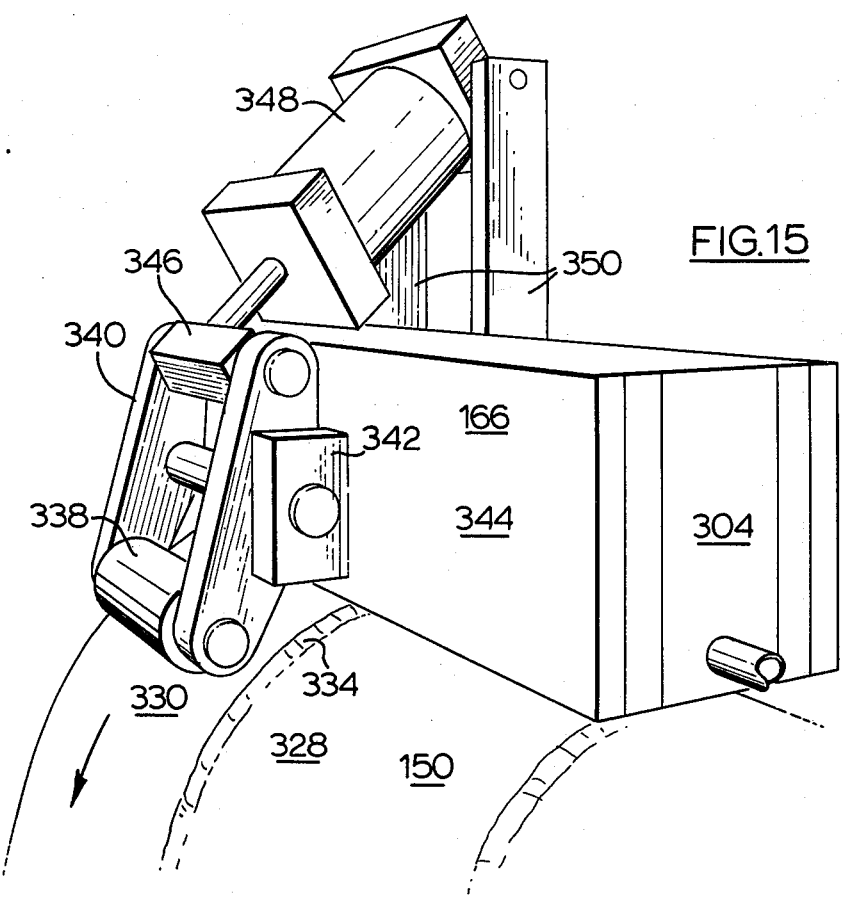
FIG. 15 is a fragmentary perspective representation showing a modification of a strip and tube regulating device to be seen in FIG. 11.
Figure 16:
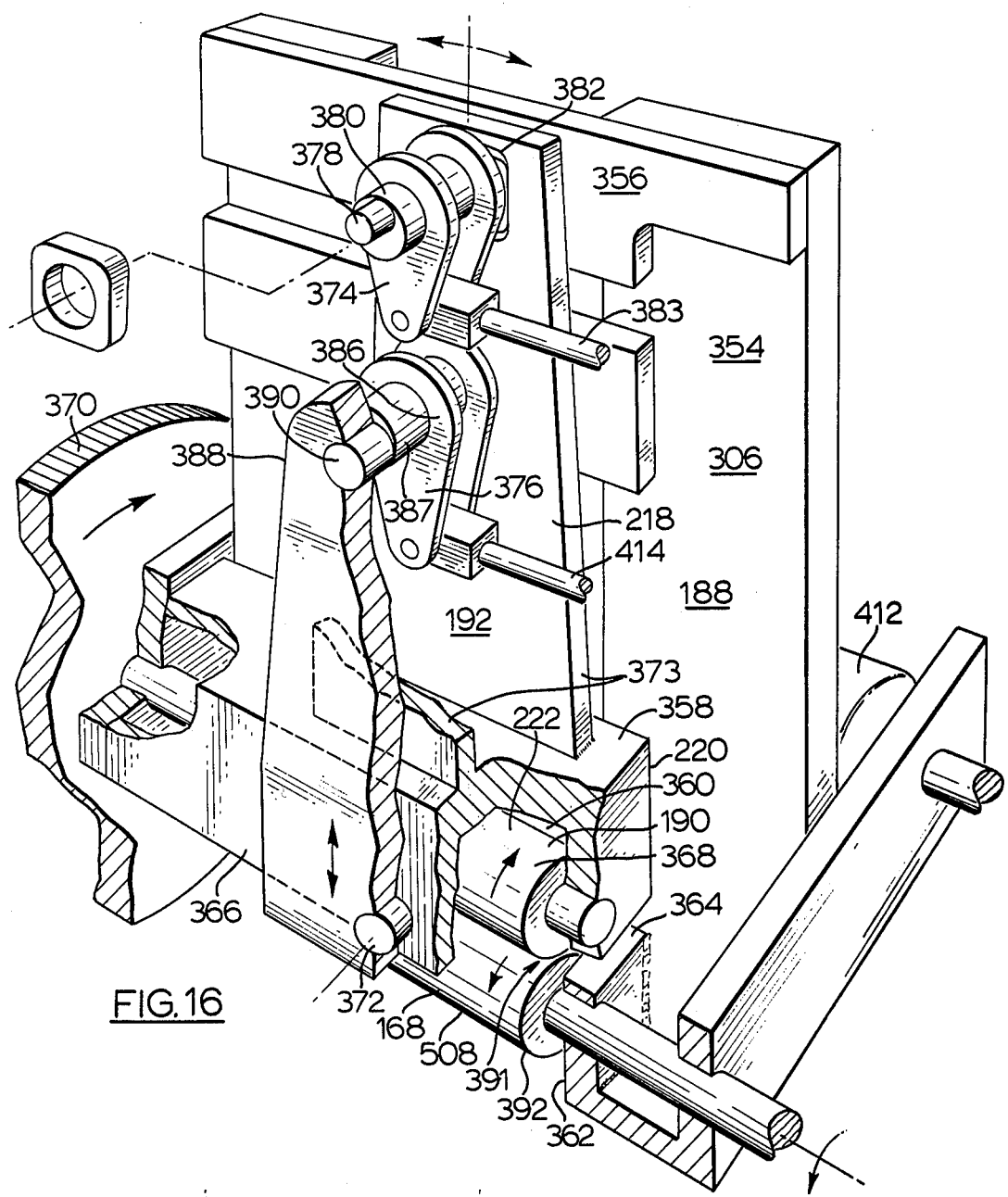
FIG. 16 is a fragmentary representation of the pinch-roller biassing means.
Figure 20:
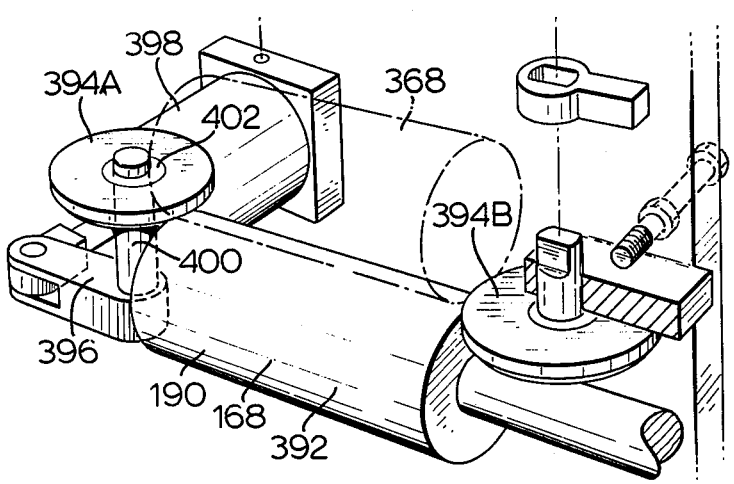
FIG. 20 is a perspective representation of the squeeze roller pair depicting the shoulder rollers thereof.

Supported on the arm 264A of tube centering floating roller chuck assembly 260 is a welding head assembly collectively designated 304 and a strip feeding and converting assembly collectively designated 306 (FIGS. 11 and 16). Describing first assembly 304 (FIGS. 10, 11, 14, 15 and 19), the same is hingedly connected at 308 (FIG. 12) to arm 264A by way of the cantilever 310 (FIGS. 11 and 20). The head is in large part a casting having the shown roller chamber 312 extending horizontally therethrough, closed at the trailing end 314 and open at the leading end in the form of a mouth 316. The said mouth also extends upon the lateral sides of the casting (FIG. 11) so as to permit tube to move between the rollers therein. Thus it will be recognized that the casting as shown in FIG. 19 constitutes an upper exterior part 318 and a lower interior part 320.

The upper exterior part 318 also contains a vertical chamber 322 for the welding electrode 172. The upper (which is also roller 262 D of the FIG. 12 assembly 194) and lower incoming strip receiving roller pair 324 occupies the trailing end of the chamber 312. The upper and lower newly-made tube ring controlling paiir 326 occupies the leading end of the said chamber.

The rollers are of course suitably journalled in the depicted bearings and a circulating water supply is indicated to flow axially through the roller shafts and cool the associated parts after welding. The newly made helical tube ring is identified 328, same being also designated herein as the trailing ring since it is the last complete ring in the tube 150 being formed. The stripstock 170 which trails the ring 328 is deemed herein an incompletely made ring and is designated 330.

A lower annularly grooved welding roller 332 spans the adjacent edge-areas of 328 and 330 for the purpose of supporting the edges during the butt-welding thereof as at 334. A pair of upper shoulder rollers 336 hold the edges down against roller 332 and in flush relationship. To assist in maintaining circularity of the as yet incomplete ring 330 after it has passed out of the chamber 312 there is shown (FIG. 15) an external control roller 338 journalled in the frame 340 and pivoted on the brackets 342 projecting from the welding head block 344. Frame 340 swings about the fulcrum provided by the brackets 342 and at the opposite end of the frame to that of the said roller is a distance-piece 346 spanning the sides of the frame to which the piston rod of a compression cylinder 348 is connected, the upper end of the cylinder being rotatable between a pair of upstanding brackets 350 also secured to block 344. FIG. 11 shows a similar frame and roller assembly minus compression cylinder to be replaced by other means for biassing the roller against the tube such as spring means.

Figure 14:
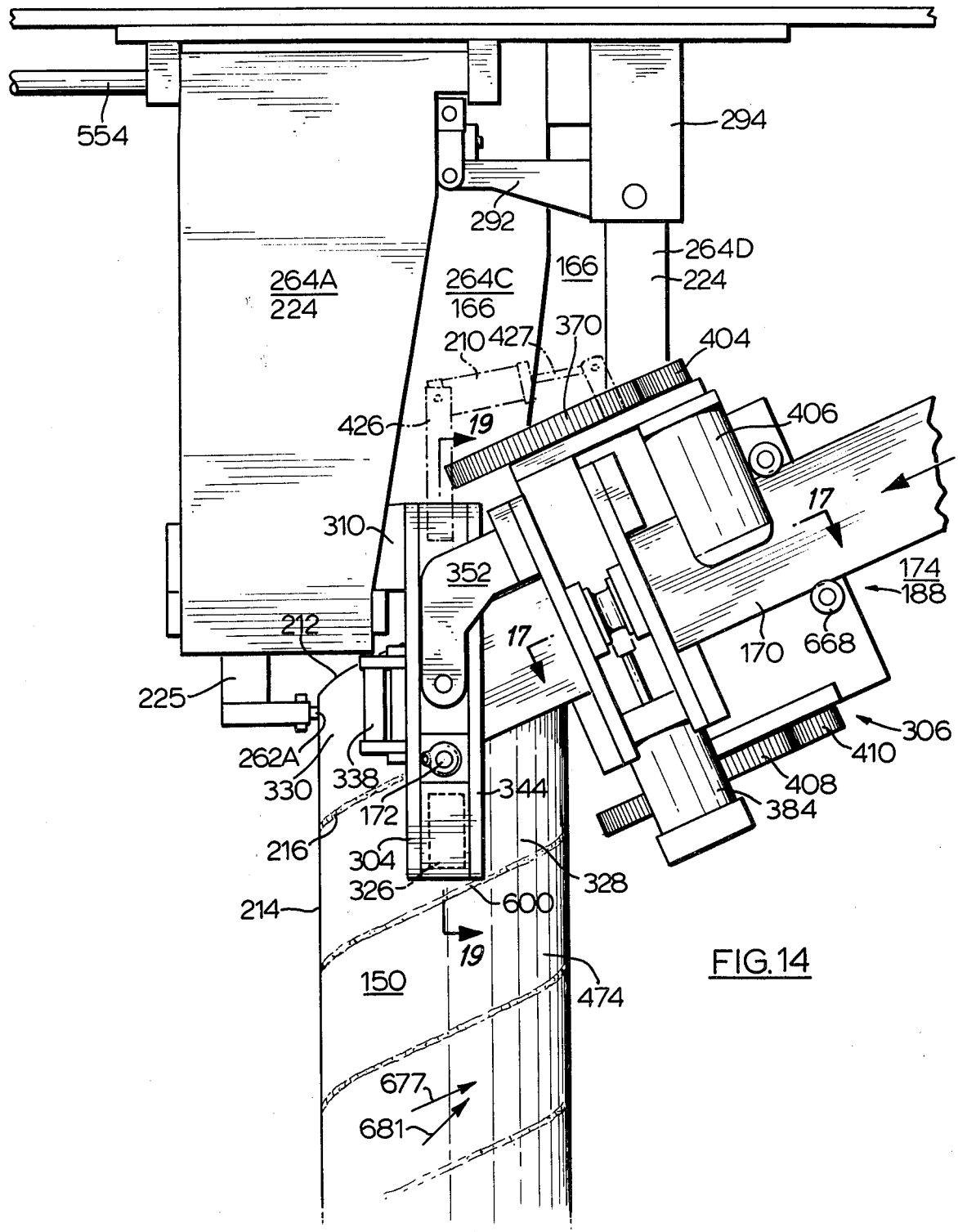
FIG. 14 is a plan view of the contents of FIG. 11.
Figure 17:
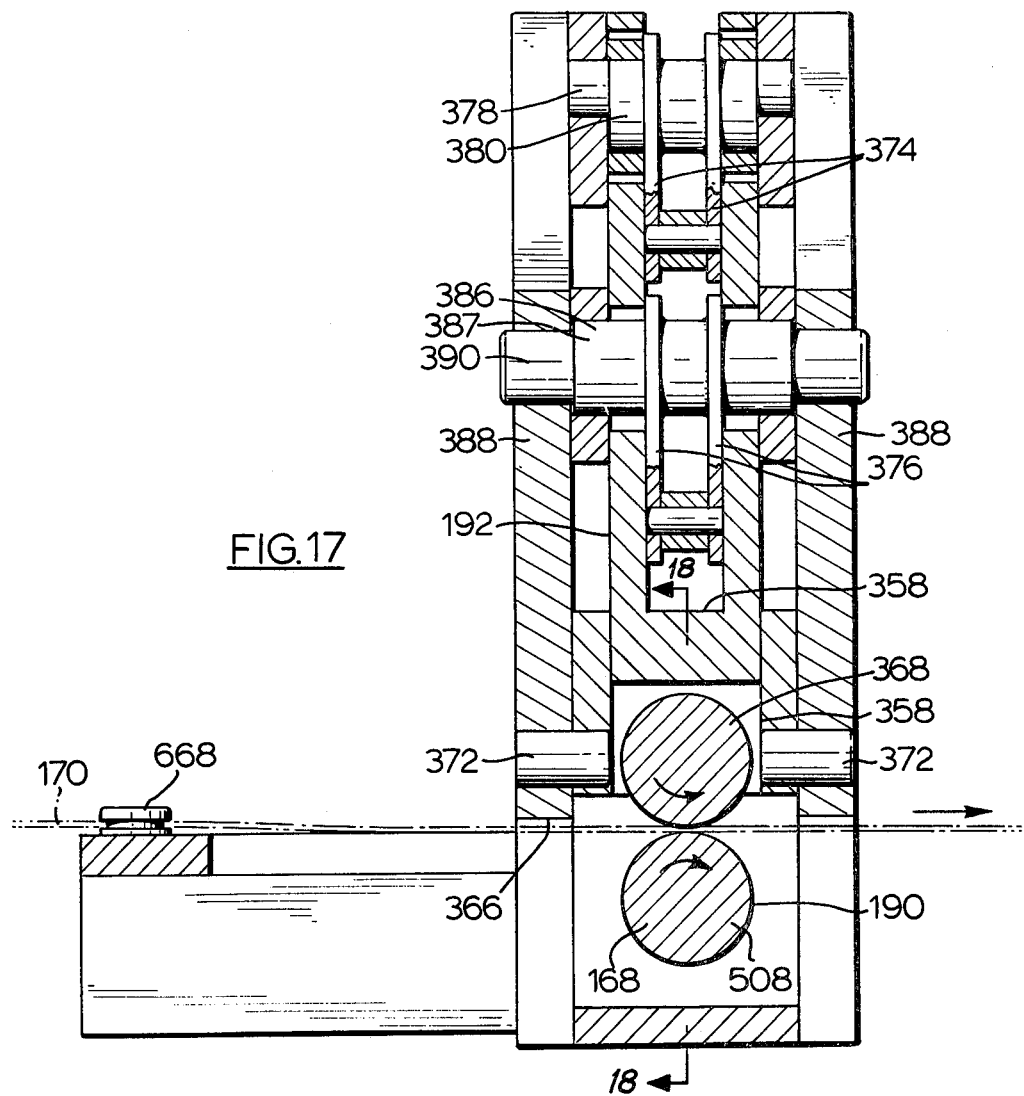
FIG. 17 is a substantially central cross-sectional elevation of FIG. 16.
Figure 18:
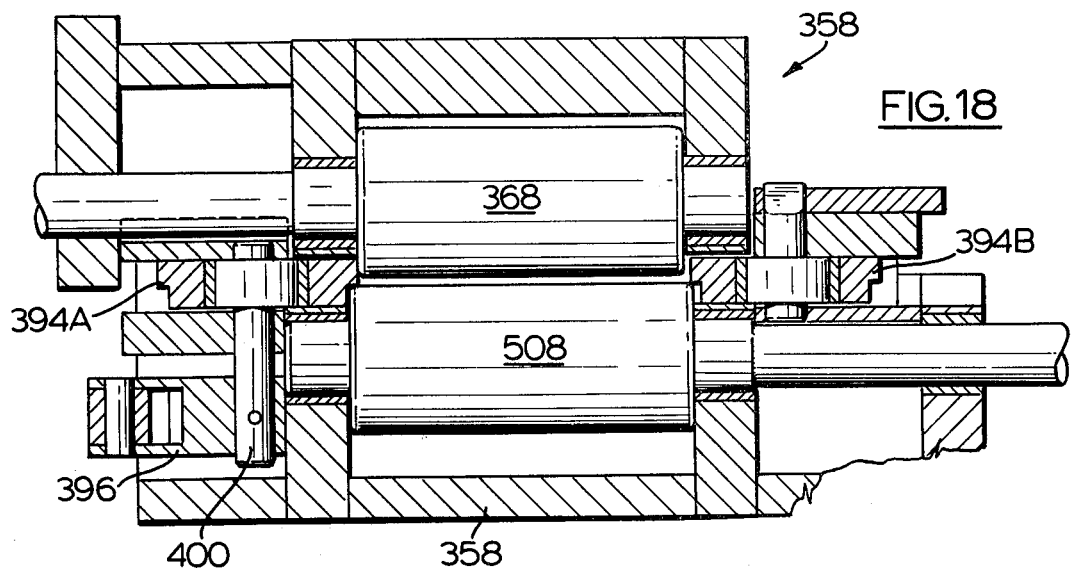
FIG. 18 is a section substantially on the line 18—18 of FIG. 17.

The strip guiding assembly 306 (FIGS. 11 and 16) is secured by way of the box-bracket 352 to the welding head assembly 304 for limited horizontal rotation as apparent from FIGS. 11 and 14. 306 embodies the set of upright supporters 354 and upper tie bar 356 (FIG. 16). At the base of the assembly 306 is a two-part rocker boxing 358 (FIG. 17), the upper and lower parts 362 being slightly spaced at 364, and all around the lower margin 366 thereof. Upper pinch-roller 368 is journalled in upper part 360 and is shafted to the gear 370. Projecting horizontally from the midpoint of the lateral walls of upper part 360 are trunnions 372 (FIGS. 16 and 17). Rising from the center of upper part 360 is a pair of spaced rocker armms 373.

Between the said rocker arms are positioned a pinch-roller bias controlling eccentric assembly 374 (FIGS. 16 and 17), and below it a pinch-roller space controlling eccentric assembly 376. The assembly 374 rotates about the axis of the stub-shaft portions 378 which are journalled for rotation about a fixed point. The eccentric elements 380 move in the apertures 382 upon endwise movement of the thrust rod 383 under the influence of compression cylinder 384 (FIGS. 11 and 14). The assembly 386 rotates about the fixed axis of roller bearing portions 387. Hence the pair of space control bars 388 will rise and fall as indicated under the influence of the eccentrically disposed stub-shafts 390. At the ends of the rollers 368 and 392 coincident with the nip 391 between them are shoulder rollers 384A and B (FIG. 20) journalled for horizontal rotation about vertical axes and intended to bear against the edges of entering strip-stock 170. The disposition of the roller 394A may be varied upon rotation of arm 396 which they may be rotated upon end-shifting of the observed rod of the associated compression cylinder 398, an upstanding rotatable standard 400 being keyed to one end of arm 396 for rotation thereby, an eccentric hub 402 being secured to the apex of the standard. It is about this eccentrically disposed hub that roller 394A concentrically rotates to vary its relationship to the adjacent roller ends.

Gear 370 is driven by spur gear 404 under the influence of the hydraulic motor 406 (FIG. 14). Lower pinch-roller 392 is rotated by gear 408 in mesh with spur gear 410 actuated by hydraulic motor 412 (FIG. 16). Thus both pinch-rollers are positively driven. Eccentric assembly 386 is rotated by way of shaft 414 from compression cylinder 416.

Bracketed to the lateral wall 418 (FIGS. 9 and 11) of enclosure 254 is a compression cylinder assembly 420 the distal end of the connecting rod 421 of which is hingedly connected for limited horizontal rotation to bearings 422 (FIG. 12) on the distal and of arm 264D. By this means, since all arms 264 move as a unit, a constant bias of the rollers 262 against the tube 150 may be maintained.

Compression cylinder assembly 424 (FIG. 11 mounted for limited horizontal rotation upon an F bracket 426 secured to the trailing end of welding head assembly 304 is hingedly connected by way of its connecting rod 427 to such as the shown convenient point on the strip guiding, feeding and converting assembly 306 so as normally to exert a separating effort as indicated by double-headed arrow 426 thereby tending to rotate the feeding, guiding and converting assembly clockwise as viewed in plan (FIG. 14). The function of compression cylinder assembly 424 is to maintain snug abutting relationship specifically at the point 430 (FIG. 19 where the welding electrode 172 is uniting the adjacent leading and trailing edges of the strip-stock 170 as same enters at an obtuse angle to the tube axis (FIG. 14). At this point also it is explained that the roller 262D of arm 264A is the upper of the pair 324 (FIG. 19).

Thus, with the aid of rollers 324, 332, pair 336 and pair 326, strip 170 is held in close edge-shutting relationship during welding, and the weld basically forms the incoming strip into the shape of spiral tube while roller 328 (FIG. 15) under pressure from such as cylinder 348 helps to relieve the elastic stress of the strip while the weld is still hot having just passed through the rollers 324. The arrangements just described and especially the roller 338 are also parts of the primary agency by which the strip is curved downwardly out of the flat. Without the roller 338, steel strip would orbit "straight out" from the locus of weld (from which it would keep breaking away), tangent to the made tube in advance (i.e., ring 328 of FIG. 15).

Reference is made to FIGS. 14 showing lower roller 326 in phantom lines. From the Figure it is clear that the rings 328 move through an advancing helical path while roller 326 is forced thereby to rotate axially normal to the tube-axis. As a result there is functional resistance between the contacting outer roller and inner ring surfaces which tends to retard the advance of the tube ahead of the roller and to force the trailing edge of the last complete trailing ring 328 into tightly abutting edge contact with the partial ring 330 behind it and which is simultaneously also forced against the trailing edge of ring 328 as already described.

The means 182 (FIGS. 9, 10, 21 and 22) comprise a cylindrical housing portion 432 having leading and trailing annular wall portions 433A and B, A and B respectively providing the enlarged central aperture 434 through which tube 150 may extend. The portions aforesaid are welded to or are co-terminous with lower portions generally designated 436. They provide supporting structure for the portion 432 and contents whereof upon and permit movement along the supporting track 236 as clearly illustrated in FIGS. 10 and 21. Projecting in the leading direction of travel of tube 150 and welded to said lower portion is the boxing 438 carrying rollers 440, additional roller means not shown providing easy travelling movement of the organization 182 as-a-whole.

Figure 21:
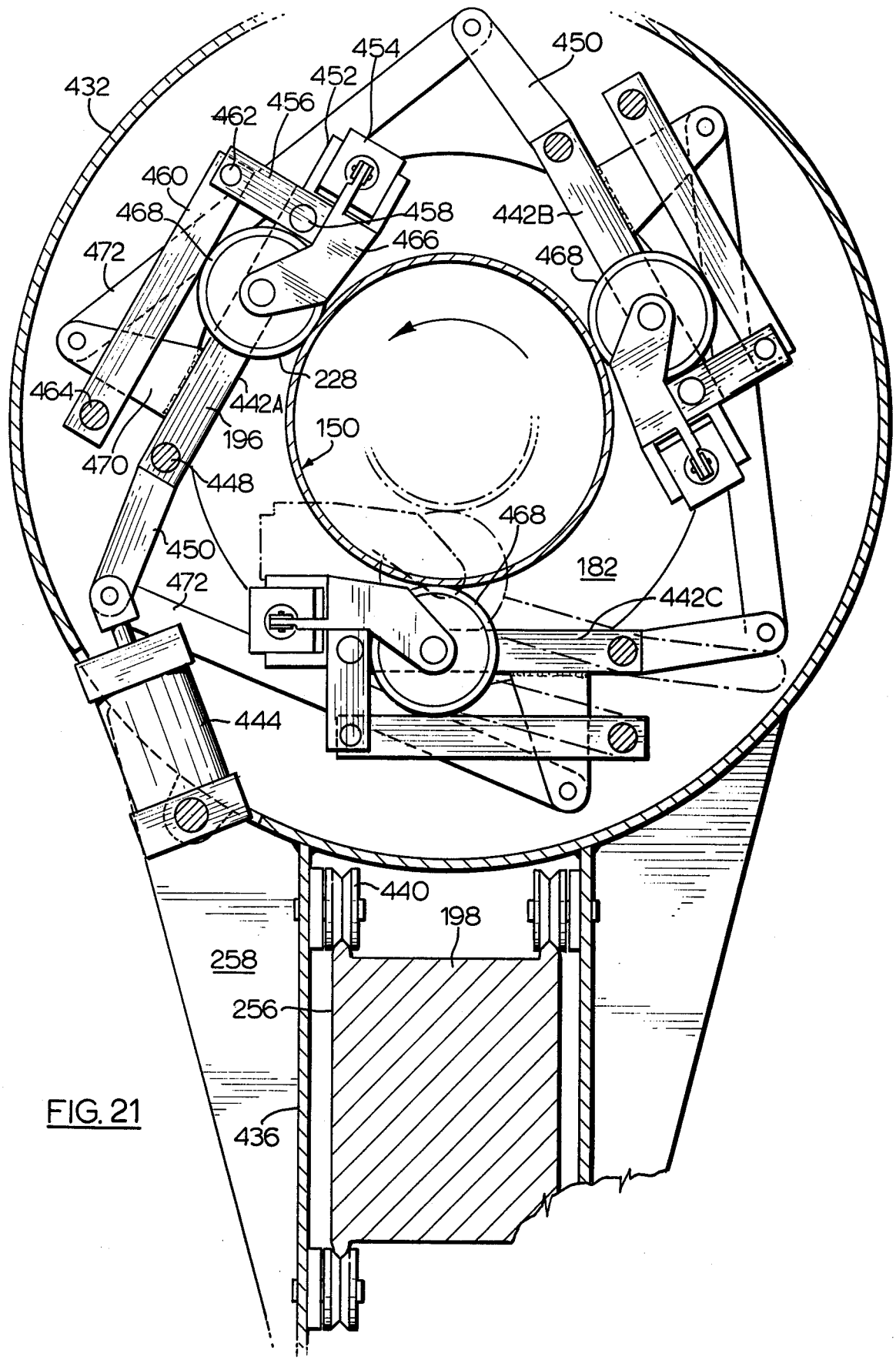
FIG. 21 is a front elevation of the first tube supporting means best illustrated in situ in FIG. 10.

Within the housing portion 432, the roller radius equalizing meand 196 in greater detail comprise three linkage assemblies 442A, B and C actuated by a compression cylinder assembly 444 suitably bracketed for limited rotation in the cylindrical housing wall of 432. All three linkage assemblies 442 are similar and accordingly only one need be described together with the connection between them. A plate-link 446 (FIG. 22) is journalled for rotation in wall 433A by way of the pivot rod 448. A link 450 couples the link 442 and the compression cylinder assembly 444. Upon the distal corner of link 446 substantially diagonally related to link 450 is a bracket 452 within which is mounted for limited rotation a transversely disposed compression cylinder assembly 454. At the opposite distal corner of plate-link 446 is an upstanding connecting link 456 pinned at 458 for limited rotation in the rotary plane or the link 446. To the opposite end of link 456 is a parallel motion link 460 rotatable about stuud 462. Link 460 moves about pivot rod 464. Upon the end of link 456 which is flush with the underside of link 446 to be seen in FIG. 22 is pivotted a castored roller assembly 466 including the shown bracket in which rubber surfaced roller 468 is journalled, and to which also is connected as well shown in FIG. 22 the aforesaid compression cylinder assembly 454. Upon the shown edge of plate-link 446 is the upstanding post 470 to the distal end of which is connected motion transfer bar 472. The opposite end of this bar connects with the link 450 of the next assembly 442B, the corresponding end of the corresponding bar of assembly 442C being connected to the compression cylinder assembly 444 (FIG. 21).

From the foregoing it is to be understood that the rollers 468 may rotate under the influence of the compression cylinder assemblies 454 from the shown position in which they axially parallel with tube 150 into a position in which they are parallel with the helically wound rings 474 (FIGS. 10 and 14) forming tube 150. When, under the influence of master compression assembly 444 the three rollers are tightly contracted upon the tube and parallel with it as in FIG. 21, obviously as the tube moves longitudinally from left to right with respect to FIG. 10 the unit 182 moves with it upon the track 198. When however, the rollers are castored so as to run parallel with rings 474 the unit remains stationary while the rollers continue to rotate. This facility is utilized in severing the tube 150 into lengths. Such severance may be effected by the cutting torch 476 mounted on the spring-loaded and pivoted standard 478 connected to boxing 438.

While the unit 182 is moving along the track 198 at the same speed as the tube 150, a clean circumferential cut at right angles to the tube axis may be effected in one revolution of the tube. However, if instead of a cutting torch, a high-speed cutting wheel is employed it is not necessary to have resort to the rather complicated linkage which has been described as within housing 432. Instead, the considerably simpler linkage assembly of FIG. 23 can be employed. Although shown axially parallel with the tube 150 the castoring roller assemblies 480 of the three linkage assemblies 482 A, B and C of the tube centering assemblies 484 in units 184 and 186 could be substituted for linkage assemblies 442. With a cutting wheel, longitudinal movement of the unit 182 is caused solely by the entry or keying-in of the cutting wheel into the material of the tube 150, the longitudinal movement of which therefore causes the unit 182 to be carried with it. As tube continues to rotate a clean and perfectly diametrical cut is obtained in one revolution of the tube provided the associated parts are well lubricated for easy running along track 256, pulled by the cutting wheel which will be further referred to again in connection with FIG. 25.

The linkage assemblies 482 are each pivotted at 486 to the side walls 488 of the cowling 490. Integral with the foregoing is the foot portion 492 supported on the movable blocks 198 (FIG. 9). The links 494 of each assembly 482 are integral with the associated links 496 whereby, upon actuation of compression cylinder assembly 497 the two links are caused to rotate about fixed pivot points 498 according to the diameter of the tube 150. Motion transfer bars 499 connect the three linkage assemblies. Assembly 482A differs only in that the link 500 connected to adjacent link 494 is at an acute angle to the adjacent link of assembly 482A while the corresponding links of the other assemblies are at an obtuse angle. At the conclusion of the cutting operation by a cutting wheel, and when the cutting wheel has been moved back out of lock as between the parted tube and the unit 182, the linkage assemblies 482 (FIG. 23) if substituting for the linkage assemblies 422 (FIG. 21) of the unit 182 will cease travelling longitudinally. Instead, the unit 182 returns to its starting position as will be further described, while the assemblies 482 return to starting position continuing to support and centre the leading end of the next tube section while doing so, and having reached such position, resume tracking parallel with the spiral rings forming the tube.

Reverting to FIG. 21 the purpose of the parallel motion links 460 and the connecting links 456 is to overcome the geometry which would supervene upon the rollers 468 but for this arrangement. Without it, when the castored roller assemblies 466 are rotated by the cylinder assemblies 454 into parallel tracking with the helical rings 474 (FIG. 14) they would rise slightly "off their treads" and tend to ride on one edge thereof. This situation can readily be envisaged by assuming that the roller assemblies 466 in FIG. 21 were rotated about the pivot 502 (FIG. 22). It will immediately be seen that the rollers 468 per se would be at a substantial acute angle with respect to the flat treads of same and the surface of tube 150. The fact that the links 460 and 456 are freely connected as described to link 442 with the cylinder assembly 454 free to swing and with the connecting rod thereof in transverse alignment with the butt end of 456 relieves the aforesaid condition so that the rollers may track parallel with the helical rings 474 across the entire width of the treads.

The diameter information feed back system 176 which may also be referred to as programming means and are best illustrated in FIGS. 24 and 25 may take a variety of different forms and the component parts thereof may with slight adaptations be relocated extensively. As exemplified however a drive wheel 504 rotated by a flxible shaft 506 in virtue of being fixed for rotation to one of the pinch-rollers 368 or 508 rotates the reversing gear drive wheel 510. 510 is preferably rubber surfaced in order to promote high frictional contact between it and drive wheel 504. Drive wheel 504 is shown to be bracket-journalled as at 511 to the edge 514 of arm 264A. Spaced outwardly from the arm by the pair of brackets 516 is a gear box 518 parallel and adjacent with which wheel 510 is positioned being shafted as at 520 to the said gear box and to a reversing gear primary pinion 522 therein. The entire reversing gear assembly 208 is suitably secured for rotation within the said box 518 the remainder of the gear train constituting assembly 208 embodying the co-axially rotatable gears 524 and 526, and the reversing action collectively designated 528 which includes a triradial or equivalent frame 530 pivotted for limited rotation and the reverse at 532. Upon the frame gears 534, 536 and 538 are journalled. Meshable with either gear 534 or 536 according to the position of lever 540 fixed to frame 530 at point 532 is a large gear 542 to which shaft 544 is keyed. Gears 536 and 538 are permanently in mesh with each other. Hence, according as either gear 534 or 536 is in mesh with gear 542 rotation of 542 clockwise and anticlockwise will occur, the actuation of lever 540 taking place under the influence of 546 and air pressure actuated cylinder 547 actuated thereby externally of boxing 518. The part numbered 504, 510, 520-2, 524-6, 534 or 536-8 and 542 are the main components of what is designated as the "the variable response and motion transferring means" of this embodiment.

Keyed for rotation to the distal end of shaft 544 is a templet or a governor means 178 already referred to as part of gradient means collectively designated 180. Its function is to rotate between the breast limits thereof clockwise or counterclockwise according to the direction dictated by the reversing action 528 within boxing 518 such rotation causing the follower 548 journalled on bracket 550 secured to arm 552 to move said arm slightly up or down about the axis 554 thereof. The arm 552 is enclosed by the two-sided casing 556. Projecting through the end of this casing opposite to the end about which the same rotates are two opposed needle valves 558A and 558B through which compressed air may be jetted on to one face or the other of a flutter plate 559 projecting from the midpoint of the distal end of arm 552 whereby one or other of the nozzles may be closed or opened according to which is being sealed by the plate 559 under the influence of follower 548 as already explained. The parts 552-9 are well representative of what is designated as the "motion translating means" of this embodiment.

In FIG. 25 a complete length 560 of tubing is shown together with the leading end of a partial length 562 in process of being fabricated. Means are shown whereby the length 560 has been severed at the leading (in this case enlarged) end 564, and whereby it is about to be severed at the (in this case reduced) trailing end 566.

Unit 182 normally moves only the indicated distance between stop 568 and the roller assembly expanding and contracting limit switch 570 for actuating the contents of unit 182 (some 4 inches using 4 inch strip-stock). Spring means such as 572 normally maintain unit 182 against step 568.

When the small or the large end of a completed tube length such as 560 has reached the location indicated by numeral 566 either the cutting torch 476 or preferably the abrasive cutting wheel 574 severs the tubing. Such completely severed tube length 560 is now pushed longitudinally rightwards by the adjacent leading end of the partial tube 562. Roller assemblies 480 on the tube supporting means 184 and 186 (FIG. 23) embrace tube length 560 and when the tube length 560 has been pushed clear of aperture 576 (FIG. 9) in housing 252 the leading end 564 will have reached the arm 578 of limit switch 580. Rotation of said arm by the tube end counter-clockwise causes the associated limit switch to open or dilate both roller assemblies 480 of units 184 and 186 thereby permitting the pole to fall out onto the dumping area immediately in front of same.

Figure 23:
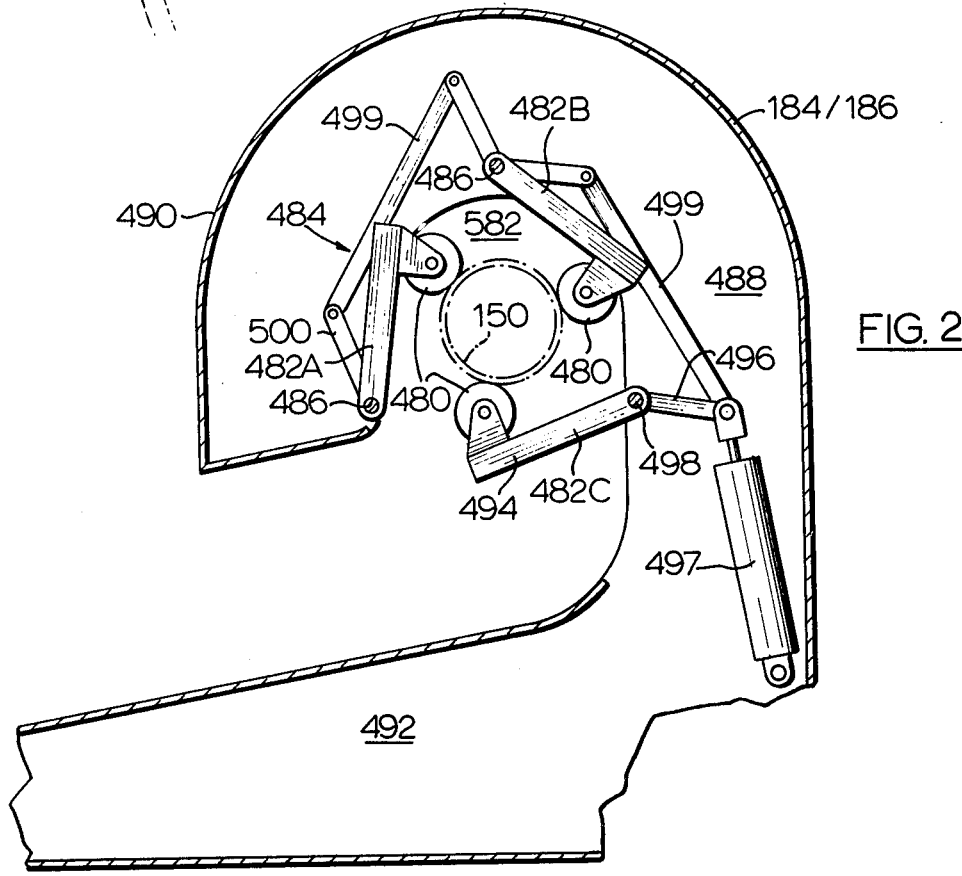
FIG. 23 is a cross-sectional representation of the contents of the second or third tube supporting means of FIG. 9.

The leading end of the partial tube 562 will meanwhile also have emerged from the aperture 576. When it has intersected the transverse planes of the roller assembly 480 within unit 184, it will rotate the arm 580 which, when not in use spans the gap 582 (FIG. 23). This actuates limit switch 584 to close the roller assembly 480 within unit 184 upon the leading end of tube length 562. In due course the tube length 562 intersects the roller assembly 480 within unit 186. When that occurs arm 586 will actuate the associated limit switch 588 in exactly the same way as has been described in connection with unit 184 so that the tube length will now be embraced by the roller assemblies on both units 184 and 186. As it continues to travel longitudinally and to rotate it will in due course intercept actuating arm 590 which energized the associated limit switch 592. This is the agency by which cutting wheel 574 (or torch 476) is actuated to sever the now completed tube 562.

The remaining activity of length 562 has already been described in connection with length 560. Limit switch 588 not only closes the tube retaining roller linkage assembly 480 within the associated unit 186 but, in addition, upon actuation energizes solenoid 546 through lead 594 to reverse via the air cylinder 547 the action 528, hence the direction of rotation of large gear 542 and the templet 178. This causes rotation of arm 552 with occlusion of the opposite one of valves 558 to that which was previously occluded. Air pressure is thus released from one or the other side of compression cylinder 384 (FIG. 11) to end-shift thrust-rod 383 (FIG. 20) in one direction or the opposite end thereby tilt upper pinch roller 368 to the opposite side from that toward which it was previously tilted and thus apply lengthening and edge-area curving pressure upon the opposite edge-area of the strip-stock 170. This reverses the gradient or in other words changes the condition of increasing diameter in each helical turn or ring of a tube being fabricated to diminishing diameter or vice versa.

Figure 31:
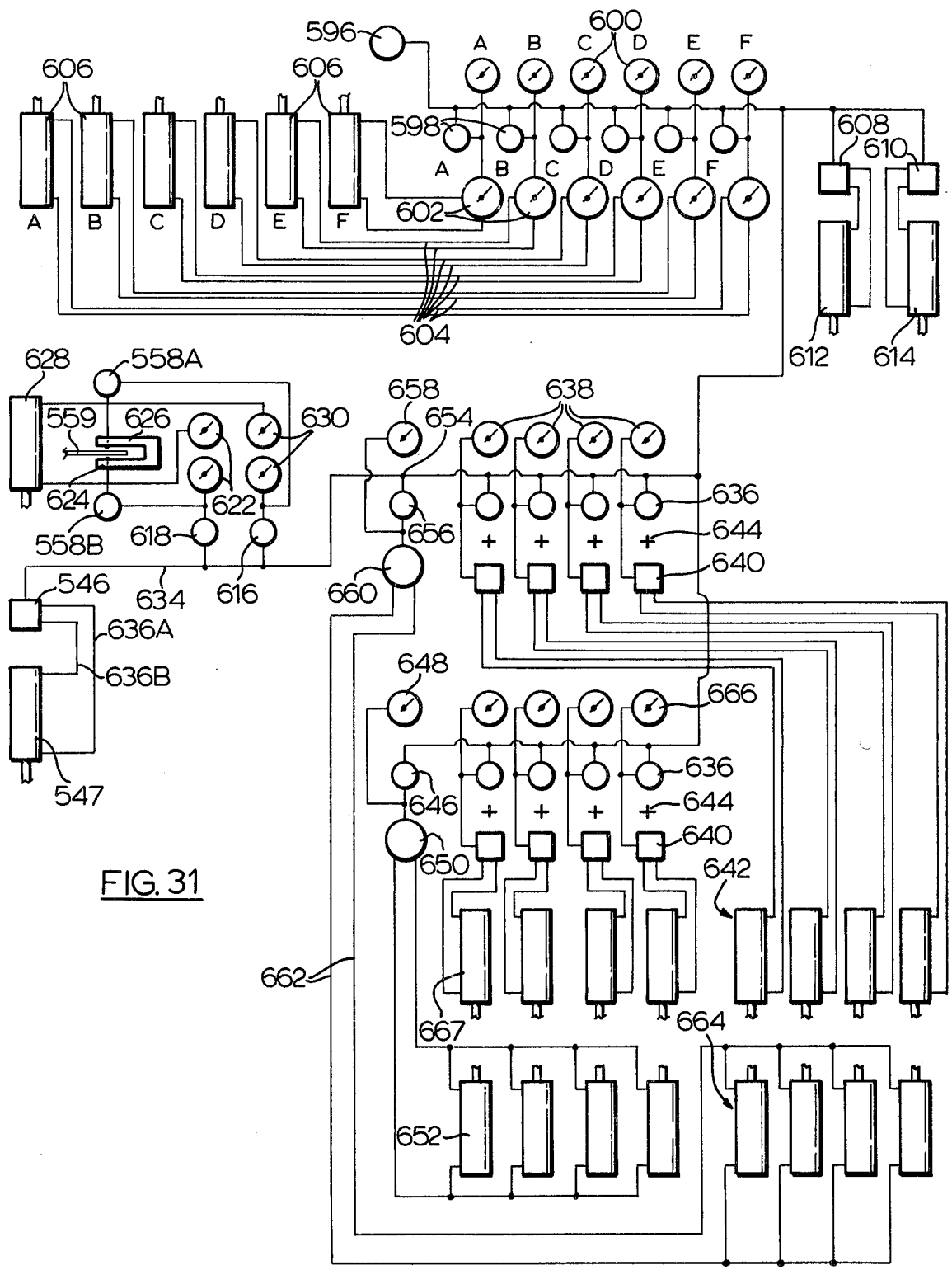
FIG. 31 is a schematic pneumatic diagram of the concerned control means.

FIG. 31 outlines a typical arrangement of the concerned air pressure regulators, valves, cylinders and the like whereby the foregoing elements an assemblies, may be operated. Numerous departures may of course be made from the arrangements illustrated within the skill of the artisan. Air under pressure from a source 596 is led to air pressure regulators 598A, B, C, D, E and F. Regulated air pressure from these is fed to gauges 600 A, B, C, D, E, and F and simultaneously to hand controlled 4-way valves 602 A, B, C, D, E, and F. From these valves it proceeds via conduits collectively designated 604 to double-acting air cylinders 606 A, B, C, D, E, and F. By way of example: Air cylinder 606F could be the compression cylinder 420 (FIG. 11). Cylinder 606E could be the compression cylinder 424 (FIG. 11). Cylinder 606C could be the compression cylinder 348 (FIG. 15). Cylinder 606D could be the compression cylinder 416 (FIG. 11). Cylinder 606A could be the compression cylinder 444 (FIG. 21). Cylinder 606B could be the compression cylinder 384 of FIG. 11 for controlling strip-stock edge pressure.

Pressurized air is also led from source 596 to the 4-way solenoid valves 608 and 610 associated with units 184 and 186 (FIGS. 9 and 25). When these valves are operated by switches 584 and 588 (FIG. 25) air cylinders 612 and 614 are caused to operate. The components of this context are set up so that when the solenoids are not energized, the valves cause the linkage assemblies 482 (FIG. 23) connected to compression cylinder assembly 497 to remain closed on the tube or pole, thus avoiding inadvertent release or dumping of the same due to shut-down of machine loss of electric power.

Pressurized air is also led from source 596 to regulators 616 and 618. Regulated air pressure from regulator 618 as indicated by gauge 622 is fed to needle valve 558B (FIGS. 24 and 25) which allows a controlled flow of air through the orifice 624, said orifice being contained in assembly 626. If flutter plate 559 completely closes orifice 624 pressurized air will be led to one end of cylinder 628 and as 559 moves away from such orifice, pressure will drop. Regulator 616, gauge 630, needle valve 558A and gauge 632 will also operate in a similar manner to the opposite end of cylinder 628 which is used to control stretch of either edge of entering strip-stock and therefore control diametrical increase or decrease of tube diameter.

Pressurized air is also led from source 596 through conduit 634 to the 4-way solenoid valve from thence, through the conduits 636A and B to air pressure actuated cylinder 547 to operate reversing action 528 (FIG. 25). Valve 546, upon actuation by limit switch 588 reverses the direction of diametrical progress of the tube or pole in process of fabrication as already described.

Pressurized air is also led from source 596 to the shown horizontal lineups of regulators 636, gauges 638 and solenoid valves 640. These 4-way solenoid valves permit air to flow to either end of the lineup of cylinders 642. Through their agency the abrasive belts to be referred to hereinafter are caused to make contact with, or swing away from the tube or pole being polished according to the setting of hand switches 644. The setting of regulators 636 may control the contact pressure of each belt against the tube to smooth off excess weld metal. In case of machine shut-down, loss of power or the like, the solenoids are so arranged that the belts are deactivated when not energized. Pressurized air from source 596 also feeds to regulator 646 and regulated pressure as indicated by gauge 648 is led to 4-way hand valve 650, thence to the lineup of cylinders collectively designated 652. Operation of the band valve 650 causes retraction of the four tube contacting wheels of the belts for easy belt replacement. A tap 654 from conduit 634 leads air to the registor, gauge and valve 656, 658 and 660 respectively similar in all respects to the arrangement indicated by parts numbered 646, 648 and 650. From these a pair of conduits 662 leads to an opposite bank of pressure cylinders collectively designated 664, it being apparent that the regulators, gauges, valves and switches, 636, 638, 640 and 644 relate to the cylinder bank 642 while the valve, gauge and regulator 650, 648 and 646, respectively service cylinders 650 and the lineup of gauges 666 and the components below it, relate to the cylinders 642 and 667.

OPERATION OF SECOND EMBODIMENT

To complete this disclosure in respect to features the use of which may not already be apparent, a supplementary functional statement follows:

Strip-stock 170 from an adjacent roll and usually with parallel opposite longitudinal edges which are straight and of equal thickness enters the machine through the pinch rollers 368 and 508 after passing between a pair of several spaced pairs of hold-down guides 668 (FIGS. 14 and 17) for line-up purposes. A bias at one end or the other of the upper pinch-roller 368 toward the lower one compresses and thins-down the edge area of the strip against which it is so biassed thus at the same time lengthening it and curving it convexly while the opposite edge is curved concavely to a corresponding extent. To admit a new roll of strip-stock or for separating the rollers equi-distantly the assembly 376 (FIG. 16) is actuated as described. The strip-stock 170 is next fed between the upper and lower rollers 324 of the welding head block 344 (FIGS. 11, 14 and 19) the upper of which, 262D, rides on the crest of the incompletely made ring 330. In the machine as constructed, the horizontal axial plane of roller 262D is generally co-incident with the axis of the hinge rod 670 of arm 264A (FIGS. 11 and 12). Preferably, also as shown in the lower right of FIG. 25, the rim of 504 contacting wheel 510, the axis of hinge-rod 670, (FIGS. 11 and 12), the nip 391 of the roller 190, and the "lay" of the strip emerging therefrom are substantially horizontally co-planar. By thus synchronizing directly the rise and subsidence of arm 264A (FIGS. 24 and 25) with tube gradient variation (via roller 262D of FIGS. 19 and 25) complex calibration is avoided.

The rollers 262A and C center the emergent spiral tube upon its horizontal flanks while roller 262 B supports it from below and diametrically opposite to roller 262D. As a butt welded continuous spiral seam 672 is formed the tube 150 gradually increases in diameter at the trailing end 566 if it is the trailing edge area 674 which is being squeezed between the pinch roller pair 190 so as to be lengthened and the edge curved convexly in the plane of the strip, or gradually decreases in diameter at the said trailing end if it is the leading edge area 676 which is being squeezed as aforesaid, in which case it is that edge area which becomes lengthened with the edge taking on convexity in the plane of the strip, an example of such gradually decreasing diameter, in finished form, being seen in tube length 560 of FIG. 25. Tube lengths in process of being completed accordingly move longitudinally rightward and simultaneously rotate, passing through the linkage assembly 442 within cylindrical housing 432 (FIGS. 10 and 21).

While the housing and associated parts are held stationary against the stop 568 (FIG. 25) the rollers 468 arrange themselves into rotary alignment with the spiral winding of the tube (see arrow 677, FIG. 14) in such an oblique attitude they accordingly idle. However, as soon as the advancing pole strikes arm 590 it actuates limit switch 592 to energise cutting wheel 574. Penetration of the wheel into the metal of the tube forming cut 678 moves the unit 182 rightward for the duration of one revolution and for a distance generally that of the width of the stock against the restraint of spring 572. As the unit 182 is pulled rightwardly by the cutting wheel suitably mounted thereon the rollers swivel into the position of FIG. 21. By the time a diametrical cut has been completed in the rotary tube wheel 574 has moved clear of the tube, the unit 182 having reached arm 680 of limit switch 570 which de-activates the cutting wheel and allows spring 572 to return the unit to stop 568.

Rollers 468 meanwhile continue firmly to support the tube having been caused for the duration of their short return travel to swivel due to frictional drag against the tube into an oblique attitude of the same general direction but steeper than the above idling attitude (see arrow 681, FIG. 14). At the conclusion of the return they revert of course to the idling rotary attitude 677. The foregoing statement has particular reference to the preferred and much simpler cutting wheel modification of FIG. 23. As to that shown in FIG. 10, since severance is effected by the torch 476 the unit 182 actuation thereof means its ignition, and since not in draft contact with tube 150 the unit is returned by actuation of the compressed air cylinder assembly 232, being advanced by rotation of rollers 468 by the cylinder assemblies 454 into the shown FIG. 21 position from idling attitude 677 (FIG. 14) preceding paragraph in which shown position the rollers drag the unit rightwardly to severance and then rotate to attitude 681 (FIG. 14) for return as stated, it being understood that the compression assemblies 454 act generally as springs by which if needed they might be largely or wholly supplanted. By means of the compressed air assemblies 444 and 497 (FIGS. 21 and 23 respectively) increased or decreased pressure by the linkage assemblies may be applied to tube 150 to help control together with the roller pair 326 (FIG. 19) the amount of end-thrust which is applied towards the fabricating means 166.

While the tube 150 is within the housing 252 and fully enclosed to confine the dust, a set of abrasive belts 684 actuated from a common shaft about which the upper ends may rotate grinds off the excess weld metal from the seams and uniformly finishes the surface of the tube 150 at the upper freely swinging distal ends as seen in FIG. 9. This however is not deemed of inventive moment. Preferably there should be a bank of such abrasive belts (as also shown) on each side of the tube between the fabricating assembly and the first supporting unit 182.

As the tube 150 alters in diameter, the set of rollers 262 move radially inwards or outwards equi-distantly in virtue of the mechanism which has been explained in connection with FIGS. 12 and 13. According as roller 262D moves upwardly or downwardly (FIGS. 12, 19, 24 and 25) so moves arm 264A about the hinge rod 554. Gear box 518 is located fixedly by brackets or the like projecting from the seen wall of enclosure 254. The surface of drive wheel 510 which projects rearwardly and externally of gear-box 518 is in contact with the rim of wheel 504. Wheel 504 journalled on a bracket means such as that shown as 512 secured to arm 264A rotates wheel 510 due to being driven by pinch roller 368 by way of flexible shaft 506. Having regard for the already described gear train within box 518 (FIG. 25) gradient control means 178 are rotated clockwise or counter clockwise (according as whether or not solenoid 546 is energized) to actuate follower 548 and shaft 552 thereby gradually closing or gradually opening air valves 558 A or B to bias roller 368 more or less heavily as to one or the other edge thereof against corresponding edges or edge areas of strip 170, through compression cylinder 384 (FIGS. 11 and 16).

Since arm 264A rotates vertically about 554 under the "floating" influence of roller 262D thereon (FIG. 25) and wheel 504 is fixed to it, wheel 504 can move radially over the face of wheel 510. The further it moves toward the perimeter, the more slowly is wheel 510 rotated by it. Cam 178 correspondingly rotates more slowly. Slowing down is most noticeable at large diameters of the tube 150. With larger diameters there is less "stretching" and compression of the longer strip-stock edge, and less curvature upon such edge than with the smaller and "tighter" diameters. Therefore roller 262D may be regarded as the originating agency for gradual change in bias of the roller 368.

By reference to FIG. 25 it will be seen from the schematic side elevation of the present machine included therein that severing of tube lengths 560 in the fabrication of tapered poles takes place at the leading and trailing ends 564 and 566 which represent the maximum and minimum diameter of the tube. From what has been described in connection with the schematic elevation aforesaid it will be seen that as a length of tube is process of being fabricated into a complete tube length 560 is supported when it has emerged from the housing 252 sufficiently to intersect unit 184 it is gripped by the linkage assembly 482 therein (FIG. 23), the rollers of which linkage assembly are so set as to permit the growing tube to continue travelling rightwardly until it reaches unit 186 at the time of intersecting which it is grabbed by a similar roller assembly therein upon actuation of arm 586 by the leading tube end, the actuation of such arm additionally energizing solenoid 546 through lead 594 to motivate reversing action 528 causing gradient or cam element 178 to change direction whereby, through arm 552 and the valves 558, pinch roller 368 is biassed to the opposite edge so commencing to apply pressure to the opposite edge of the entering struc-stock 170 and cause diametrical change in a new tube length from increasing diameter to diminishing diameter or vice-versa with espect to what has been occurring immediately prior to that event. When the tube-length reaches limit switch 592, it actuates arm 590 to energize said limit switch end motivate cutting wheel 572 (or torch 476). When the leading end 564 reaches limit switch 580, it rotates arm 578 to open the roller assemblies 482 in both dumping units 184 and 186 thereby permitting the completed tube length 560 to roll into the general dumping area 686 (FIG. 9). Alternatively the tube length may be caught upon cradles where shown in chain lines to be lifted out manually or otherwise.

Various modifications may be constructed or performed within the scope of the invention concept disclosed. Therefore what has been set forth is intended to illustrate such concept and is not for the purpose of limiting protection to any herein particularly described embodiment thereof.

I claim:

1. A method of manufacturing tubing comprising applying pressure to each edge of flat strip-stock in turn so as to impart alternating parallel curvature to the edges thereof in the plane of the stock, helically winding the stock and joining the adjacent edges of the helically wound stock thereby to produce tubing which alternately increases and decreases in diameter.

2. A method according to claim 1 which includes the step of severing the tubing into lengths such that each length comprises at least one portion of increasing diameter and at least one portion of decreasing diameter.

3. A method according to claim 1 which includes the step of severing the tubing into lengths substantially at the junction between portions of increasing and decreasing diameter.

4. A process for producing frusto-conical tube of gradually varying diameter by winding strip stock into a chain of frusto-conical helical turns and joining the edges thereof as they are wound, comprising the steps of:

(i) automatically continuously sensing the variation in tube iameter as it is being produced, (ii) automatically governing said variation responsive to rotation of a pair of stock-edge squeezing rollers, (iii) automatically feeding back sensed information of said variation in tube diameter to effect the desired adjustment in spacing between said rollers, and for automatically controlling the rate at which said variation takes place.

5. The invention according to claim 4 which includes the step of automatically controlling the rate at which said variation takes place responsive to the rotation of said rollers.

6. The invention according to claim 5 in which the adjacent edges of adjacent turns are so welded to each other as to provide a smooth external tube surface.

7. The process according to claim 4 wherein tube is produced in continuous successive tapered lengths of tube, each alternate length increasing in diameter and each intervening length decreasing.

8. A method of producing tapered tubing out of strip-stock while being continuously wound through a concatenation of helical turns into elongated helical form in combination comprising the steps of:
   (i) continuously sensing the variation in diameter of said tubing as it is so produced,
   (ii) continuously varying the amount of pressure applied against one edge-area of said strip-stock relative to the opposite edge-area thereof so as simultaneously and variably to diminish its thickness and increase its length thereby curving said stock in its plane, and
   (iii) welding together the edges of adjacent helical turns of aid tubing as the same are being fabricated.

9. The invention according to claim 8 which includes the step of continuously varying the rate of change of pressure applied to said edge-area according to the diameter of the portion of tubing being fabricated.

10. The invention according to claim 8 which includes the step of producing said tubing in continuous successive tapered lengths each alternate length increasing in diameter and each intervening length decreasing as it is being produced.

11. The invention according to claim 10 in which said step is effected by applying said pressure alternately to opposite edge-areas of said strip for the duration of time required to fabricate each length.

12. The invention according to claim 8 which includes welding the adjacent edges of said helically wound stock to effect a smooth external tube surface.

13. A method of producing tapered tubing out of strip-stock while being continuously wound through a concatenation of helical turns into elongated helical form in combination comprising the steps of:
   (i) continuously sensing the variation in diameter of said tubing as it is so produced,
   (ii) continuously varying the amount of pressure applied against one edge-area of said strip-stock relative to the opposite edge-area thereof so as simultaneously and variably to diminish its thickness and increase its length thereby curving said stock in its plane,
   (iii) joining together the edges of adjacent helical turns, and
   (iv) continuously varying the rate of change of pressure applied to said edge-area according to the diameter of the portion of tubing being fabricated.

14. A method of producing tapered tubing out of strip-stock while being continuously wound through a concatenation of helical turns into elongated helical form in combination comprising the steps of:
   (i) continuously sensing the variation in diameter of said tubing as it is so produced,
   (ii) continuously varying the amount of pressure applied against one edge-area of said strip-stock relative to the opposite edge-area thereof so as simultaneously and variably to diminish its thickness and increase its length thereby curving said stock in its plane,
   (iii) joining together the edges of adjacent helical turns, and
   (iv) producing said tubing in continuous successive tapered lengths each alternate length increasing in diameter and each intervening length decreasing as it is being produced.

15. The invention according to claim 14 in which said step of producing said tubing in continuous successive tapered alternate and intervening lengths is effected by applying pressure alternately to opposite edge-areas of said strip for the duration of time required to fabricate each length.

* * * * *